(12) United States Patent
Bunderson et al.

(10) Patent No.: US 12,509,408 B2
(45) Date of Patent: Dec. 30, 2025

(54) MULTIPLE ION NANOPARTICLE FOR DELIVERY OF AGRICULTURAL PRODUCTS

(71) Applicant: BFP Management, LLC, Salt Lake City, UT (US)

(72) Inventors: Landon Bunderson, Springville, UT (US); Christopher Hendrickson, Salt Lake City, UT (US)

(73) Assignee: Aqua Yield Operations, Inc., Sandy, UT (US)

( * ) Notice: Subject to any disclaimer, the term of this patent is extended or adjusted under 35 U.S.C. 154(b) by 787 days.

(21) Appl. No.: 17/571,378

(22) Filed: Jan. 7, 2022

(65) Prior Publication Data

US 2022/0213004 A1    Jul. 7, 2022

Related U.S. Application Data

(60) Provisional application No. 63/134,891, filed on Jan. 7, 2021.

(51) Int. Cl.
*C05G 5/35* (2020.01)
*C05G 1/00* (2006.01)

(52) U.S. Cl.
CPC  *C05G 5/35* (2020.02); *C05G 1/00* (2013.01)

(58) Field of Classification Search
CPC ... C05G 5/35; C05G 1/00; C05G 5/10; C05G 5/23; C05G 5/30; C05G 5/40; C05D 1/00; C05D 3/00; C05D 9/00; C05D 9/02
See application file for complete search history.

(56) References Cited

U.S. PATENT DOCUMENTS

| | | | |
|---|---|---|---|
| 2,510,231 A * | 6/1950 | Juzwiak | A01C 15/16 222/274 |
| 3,010,785 A | 11/1961 | Barrer et al. | |
| 10,532,957 B1 | 1/2020 | Lu | |
| 2015/0056259 A1 | 2/2015 | Sharma et al. | |
| 2017/0233303 A1* | 8/2017 | Bunderson | C05G 5/23 71/61 |
| 2019/0388862 A1* | 12/2019 | Strauss | G06N 3/123 |
| 2020/0216367 A1 | 7/2020 | Bunderson | |

(Continued)

FOREIGN PATENT DOCUMENTS

| | | |
|---|---|---|
| EP | 4274820 A1 | 11/2023 |
| WO | 2013119183 A1 | 8/2013 |
| WO | 2022150652 A1 | 7/2022 |

OTHER PUBLICATIONS

Sögaard, Christian, Johan Funehag, and Zareen Abbas. "Silica sol as grouting material: a physio-chemical analysis." Nano convergence 5 (2018): 1-15. (Year: 2018).*

(Continued)

*Primary Examiner* — Jennifer A Smith
(74) *Attorney, Agent, or Firm* — TechLaw Ventures, PLLC; Terrence J. Edwards

(57) ABSTRACT

The disclosure extends to multiple ion nanoparticles for delivery of agricultural products and ions. A composition includes a structural particle and a plurality of ions disposed around the structural particle. The plurality of ions forms a plurality of ion layers surrounding the structural particle. The plurality of ions comprises a plurality of a first ion having a positive charge and a plurality of a second ion having a negative charge.

24 Claims, 9 Drawing Sheets

(56) References Cited

U.S. PATENT DOCUMENTS

2020/0223765 A1    7/2020   Bunderson
2020/0325082 A1   10/2020   Bunderson et al.

OTHER PUBLICATIONS

Kumar, Yogendra, et al. "Nanofertilizers and their role in sustainable agriculture." Annals of Plant and Soil Research 23.3 (2021): 238-255. (Year: 2021).*

Katende et al., "A critical review of low salinity water flooding: Mechanism, laboratory and field application", Journal of Molecular Liquids, vol. 278, (2019), pp. 627-649 [2].

Matusiak et al., "Stability of colloidal systems—a review of the stability measurements methods", Annales Universitatis Mariae Curie-Sklodowska, sectio AA-Chemia, [S.I.], v. 72, n. 1, p. 33, Dec. 2017 [2].

Examination Report No. 1 of Australian Patent Application No. 2022205667 dated Jun. 20, 2024.

International Search Report and Written Opinion Received from ISA/US for PCT Application No. PCT/US22/11711, Date of Mailing: Apr. 27, 2022, 8 pages.

Examiner's Requisition of Canadian Patent Application No. 3207298 dated Sep. 26, 2024.

Extended European Search Report of European Patent Application No. 22737215.8 dated Nov. 12, 2024.

"Deepesh Bhardwaj et al: ""Synthesis and surfactant modification of clinoptilolite and montmorillonite for the removal of nitrate and preparation of slow release nitrogen fertilizer"", Journal of Hazardous Materials, Elsevier, Amsterdam, NL, vol. 227, May 17, 2012 (May 17, 2012), pp. 92-300,".

* cited by examiner

MULTIPLE ION NANOPARTICLE FOR DELIVERY OF AGRICULTURAL PRODUCTS

CROSS-REFERENCE TO RELATED APPLICATIONS

This application claims the benefit of U.S. Provisional Patent Application No. 63/134,891, filed Jan. 7, 2021, entitled "MULTIPLE ION NANOPARTICLE FOR DELIVERY OF AGRICULTURAL PRODUCTS," which is incorporated herein by reference in its entirety, including but not limited to those portions that specifically appear hereinafter, the incorporation by reference being made with the following exception: In the event that that any portion of the above-reference provisional application is inconsistent with this application, this application supersedes the above-reference provisional application.

TECHNICAL FIELD

The disclosure relates generally to methods, systems, and products for accelerating the establishment and growth of plants and other living organisms.

BACKGROUND

The agricultural industry, home-based growers, and other commercial growers commonly use fertilizers to promote increased plant health and plant growth. Fertilizers include natural and synthetic materials that are applied to soil or to plant tissues to supply one or more plant nutrients essential to the growth of plants.

Current fertilization systems are inefficient and fail to deliver nutrition directly to plant cells in the amounts needed by the plant. Some common fertilizer application methods include injection, which includes placing fertilizer below the soil near plant roots; surface broadcasting, which includes applying fertilizer on the surface of the soil across a field; topdressing, which includes applying fertilizer on established fields; and seed placement, which includes applying fertilizer in conjunction with seeds during planting. Each of these application methods typically calls for over-application of fertilizer to ensure that a sufficient number of nutrients are taken up by the plant. The crop, agricultural, and horticultural growing industries commonly provide super-optimal levels of the fertilizer composition, which includes many more nutrient ions than are actually needed or used by the plants. The super-optimal levels are typically provided through increased application frequency and/or increased nutrient concentration. This over-application is inefficient, costly, bad for the environment, and undesirable for the plants.

In light of the foregoing deficiencies in current fertilization methods, disclosed herein are compositions, methods, and systems for efficient delivery of agricultural products for accelerating the establishment and growth of plants and other living organisms. Specifically, disclosed herein are multiple ion nanoparticles comprising one or more layers of ions for delivery of agricultural products.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified.

Advantages of the disclosure will become better understood with regard to the following description and accompanying drawings where.

DETAILED DESCRIPTION

Figure 1:
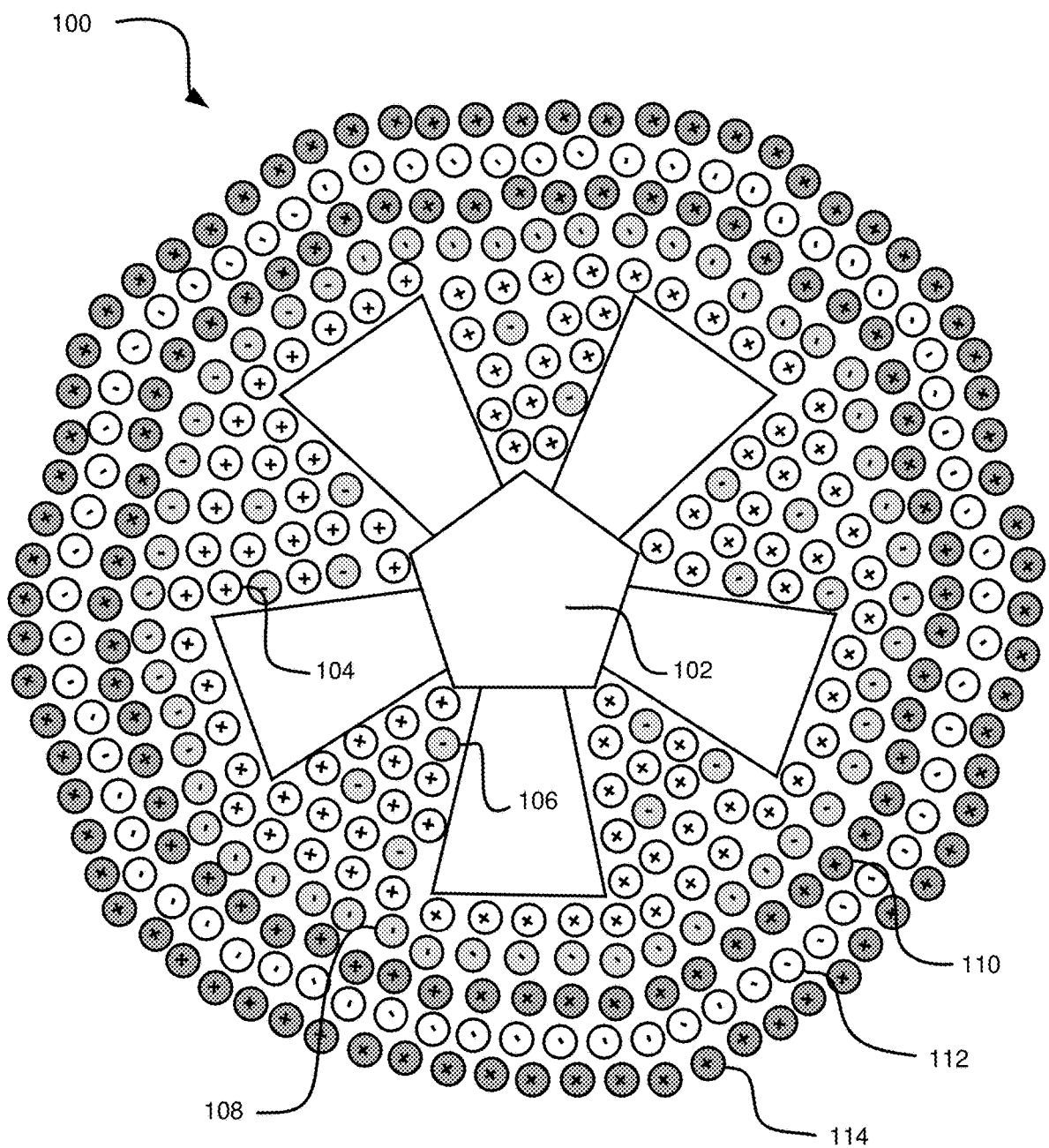
FIG. 1 illustrates a multiple ion nanoparticle including a structural particle and a plurality of ions.

Disclosed herein are methods, systems, and products for efficient delivery of agricultural products for accelerating the establishment and growth of plants and other living organisms. Specifically, disclosed herein is a multiple ion nanoparticle comprising a plurality of layers of ions. The multiple ion nanoparticle may comprise one or more exchanged ions and may additionally include one or more additional fertilizer ions in a layered configuration. The multiple ion nanoparticle is uniquely suited to pass through plant cells and be efficiently absorbed by plants. The multiple ion nanoparticle described herein provides an efficient means for delivering precise quantities of fertilizer to plants. The multiple ion nanoparticle thereby reduces the costs, environmental waste, and negative plant reactions associated with known methods of applying super-optimal fertilizer quantities.

A composition described herein includes a structural particle and a plurality of ions disposed around the structural particle. The plurality of ions form a plurality of ion layers that surround the structural particle. The plurality of ions comprises a plurality of a first ion having a positive charge and further comprise a plurality of a second ion having a negative charge.

For the purposes of promoting an understanding of the principles in accordance with the disclosure, reference will now be made to the implementations and embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the agricultural products, compositions, and methods for suspending fertilizer and/or agricultural products in a solution are disclosed and described, it is to be understood that this disclosure is not limited to the configurations, process steps, ingredients and materials disclosed herein as such configurations, process steps, ingredients, and materials may vary somewhat. It is also to be understood that the terminology employed herein is used for the purpose of describing embodiments and implementations only and is not intended to be limiting since the scope of the disclosure will be limited only by the appended claims, if any, and equivalents thereof.

The publications and other reference materials referred to herein to describe the background of the disclosure, and to provide additional detail regarding its practice, are hereby incorporated by reference herein in their entireties, with the following exception: If any portion of said reference materials is inconsistent with this application, this application supersedes said reference materials. The reference materials discussed herein are provided solely for their disclosure prior to the filing date of this application. Nothing herein is to be construed as a suggestion or admission that the inventors are not entitled to antedate such disclosure by virtue of prior disclosure, or to distinguish the disclosure from the subject matter disclosed in the reference materials.

In describing and claiming the subject matter of the disclosure, the following terminology will be used in accordance with the definitions set out below.

It must be noted that, as used in this specification and the appended claims, if any, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element, step, or ingredient not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

As used herein, the term "synthetic" includes "wholly synthetic" compounds, solutions, and substances and "partially synthetic" compounds, solutions, and substances. It will be appreciated that a wholly synthetic compound, solution, or substance is entirely generated or synthesized in a laboratory, whereas a partially synthetic compound, solution or substance is chemically altered from its natural or native state. By way of example, a wholly synthetic structural particle may be a crystalline structure that is generated or synthesized in a laboratory setting from non-crystalline molecules and ions. By way of further example, a partially synthetic structural particle may be a crystalline structure that is a native mineral that has been chemically altered in a laboratory. It will be appreciated that the laboratory may be a mobile laboratory or a stationary factory or laboratory without departing from the scope of the disclosure.

As used herein, the term "ultrapure water" is intended to mean water that has been purified such that it measures 18.3 mega ohms of resistance or less and may include water having a designation to those skilled in the art of "ultrapure water." Pure water is intended to denote water that is relatively reactive (when compared to water having contaminants therein) with its surroundings due primarily to the polarized nature of water molecules. For example: it should be noted that, water, a tiny combination of three nuclei and ten electrons possesses special properties that make it unique among the more than 15 million chemical species we are presently aware of and essential to all life. A water molecule is electrically neutral, but the arrangement of the hydrogen atoms and the oxygen atom is such that a charge displacement is created thus constituting an electric dipole, or polar molecule, with one end (the end with the hydrogen atom) being positive and the other end (the end with the oxygen atom) being negative. Because, opposite charges attract, the negative end of one water molecule will tend to orient itself in a fashion that will bring it close to the positive end of another molecule that is nearby. This dipole-dipole attraction is less than that of a normal chemical bond and is dynamic in nature. Further, this attraction causes complex structures that are temporary in nature and thus always changing. The various structures can be influenced by other elements (contaminants) that can provide electrical balance for these structures, thereby stabilizing the structures and making a body of water less reactive.

Water is a unique compound that has many different chemical and physical properties. For example, water molecules may include any or all the following bonding types. In water, a strong hydrogen bond is present with the OH covalent bond within the water molecule. A weak hydrogen bond is the bond between two water molecules. This weak hydrogen bond is also responsible for water bonding with ammonia, for example (thus ammonia's remarkably high solubility in water). Water also includes ionic attraction due to their positive and negative ions. By way of example, sodium ions and chlorine ions have an ionic attraction, which will form an ionic bond creating sodium chloride. Water also experiences permanent dipole moments; H2O, NH3, and PC13 are examples of molecules with a permanent dipole moment. Water may also include ion-dipole interactions. Sodium ions in water will create an ion-dipole interaction where the dipole will orient its' negative side towards the sodium (a positive ion). Chlorine ions conversely will create an ion-dipole interaction where the dipole will orient its' positive side towards the chlorine (a negative ion). Water may also experience dipole-dipole interactions. Dipoles will orient themselves with their negatively charged side towards the other's positively charged side. Water may also experience ion-induced dipole interactions. Nearby ions can distort electron clouds (even in dipoles) temporarily changing their dipole moments. This effect is particularly strong in larger ions such as SO22—this action can play a dominant role in compound formation. Water may also experience dipole-induced dipole interactions. Hydrocarbons, which are non-polar in nature, may create an example of a dipole (in this case water) creating a hydrate compound as the water dipole creates a temporary dipole out of the non-polar species (the hydrocarbons). Water may also experience dispersion (London force) interactions. These dipole independent forces are evidenced when we consider that nitrogen as N2 may be condensed to liquids or solids.

It will be understood that ultrapure water contains virtually no inorganic matter, such as cations, anions, solids, nor does it contain organic matter, such as carbon-based material. The ASTM definition for ultrapure water, as it relates to resistivity, is shown below and this disclosure includes through type E-4:

| Parameter | | | | | | | |
|---|---|---|---|---|---|---|---|
| | Type E-1 | Type E-1.1 | Type E-1.2$^B$ | Type E-1.3$^B$ | Type E-2 | Type E-3 | Type E-4 |
| Resistivity, 25° C. | 18.3 | 18.2 | 18.2 | 18.2 | 16.5 | 12 | 0.5 |

Ultrapure water may be established using any known protocol, but one exemplary multi-stage process begins with carbon filtration, softening, reverse osmosis, deionization, exposure to ultraviolet light or radiation, and sub-micron filtration.

As used herein, "nanoparticle" or "nanoparticle size" includes an average compound or element size having a diameter in any one dimension that is 100 nanometers or less. As used herein, "submicron particle" or "submicron particle size" includes an average compound or element size having a diameter in any one dimension that is within a range of about 101 nanometers to about 1000 nanometers.

As used herein, "effective amount" means an amount of a component of a fertilizer, an agricultural product, or other compound or element sufficient to provide nutrition to a plant, or sufficient to effectuate the desired response and performance, including killing a plant or undesirable organism, at a reasonable benefit/risk ratio attending any agricultural product, compound and/or composition. For example, an effective amount of a fertilizer compound is an amount sufficient to promote the optimal or desired maturation of plants. An effective amount of a phyllosilicate or tectosilicate or a structural particle having a high ion exchange capacity is an amount sufficient to deliver an effective amount of fertilizer or agricultural product through exchange of native ions on the mineral particles with known ions/molecules of an agricultural product such as fertilizer. Further, the effective amount of the phyllosilicate or tectosilicate or structural particle must be sufficient to hold and deliver enough known ions and molecules in an agricultural product to result in promoting the optimal or desired maturation of plants. In an implementation, depending upon the desired ion of an agricultural product to be delivered to the plant cell, the quantity of ions may be more than two orders of magnitude and up to, and including, seven orders of magnitude more than available ion exchange sites within the phyllosilicate or tectosilicate structural particle. It will be appreciated that known ions, such as fertilizer or agricultural product, may be present without departing from the scope of the disclosure.

To determine the quantity of the phyllosilicate or tectosilicate structural particle, the amount of agricultural product desired in the plant is calculated first. The amount of phyllosilicate or tectosilicate or structural particle is then determined based on the number of known ions of the agricultural product and the number of exchange sites on the structural particle. As native ions are removed from the structural particle (cation exchange), known ions in the solution can take the place of the removed native ions and the known ions in the solution may then be displaced in or otherwise delivered inside the plant. It will be appreciated that sometimes the native ions "on" the phyllosilicate or tectosilicate or structural particle are tightly bound and can only be removed with a concentrated solution of known ions. In such cases, it is necessary to create a solution with at least two orders and up to seven orders of magnitude of known ions more than the available exchange sites in the structural particle.

Referring now to the figures, FIG. 1 illustrates a multiple ion nanoparticle 100 comprising a structural particle 102 and a plurality of ions 104-114 surrounding the structural particle 102. The multiple ion nanoparticle 100 is synthesized by exchanging native ions that are naturally associated with the structural particle 102 with one or more selected ions. The resulting ion exchange nanoparticle (see, e.g., 200 at FIG. 2) is further layered with one or more additional selected ions to generate the layered, multiple ion nanoparticle 100. It should be appreciated that the quantity of unique ions and the total quantity of ions illustrated in the multiple ion nanoparticle 100 depicted in FIG. 1 is exemplary only. Additionally, the shape and configuration of the structural particle 102 is exemplary only, and numerous different shapes and configurations may be possible without departing from the scope of the disclosure.

The multiple ion nanoparticle 100 described herein may comprise the structural particle 102 and a plurality of unique fertilizer ions surrounding the structural particle 102. In the exemplary implementation illustrated in FIG. 1, the multiple ion nanoparticle 100 includes a first ion 104 with a positive charge, a second ion 106 with a negative charge, a third ion 108 with a negative charge, a fourth ion 110 with a positive charge, a fifth ion 112 with a negative charge, and a sixth ion 114 with a positive charge. The quantity of unique ions, the total number of ions, and the charges of the ions may vary from implementation to implementation, and the example illustrated in FIG. 1 is exemplary only.

The structural particle 102 may initially include one or more native ions disposed within ion exchange sites throughout the structural particle 102. These one or more native ions are exchanged with one or more selected ions. The selected ions may include, for example, the first ion 104 and the second ion 106. This ion exchange nanoparticle 200, including the structural particle 102, the first ion 104, and the second ion 106, may further be combined with one or more additional fertilizer ions such as the third ion 108, the fourth ion 110, the fifth ion 112, and the sixth ion 114 to synthesize the multiple ion nanoparticle 100. Each of the ions 104-114 may include a unique fertilizer ion. The multiple ion nanoparticle 100 is uniquely capable of passing through a cell wall and delivering each of the ions 104-114 into plant cells for efficient uptake by the plant.

In an embodiment, the ion exchange nanoparticle 200 including the structural particle 102, the first ion 104, and the second ion 106 is combined with additional fertilizer ions (such as 108-114) in a liquid solution to form the multiple ion nanoparticle 100.

In an agricultural implementation, the plurality of ions 104-114 surrounding the structural particle 102 include any suitable ions for effectuating a desired result in a plant. The plurality of ions 104-114 may include, for example, nitrogen, phosphorous, potassium, calcium, magnesium, sulfur, zinc, chlorine, boron, molybdenum, copper, iron, manganese, cobalt, nickel, and/or iron.

The multiple ion nanoparticle 100 is structured such that each layer comprises only one ionic polarity or comprises mostly one ionic polarity. The ion layer is formed around the structural particle, and the plurality of ion layers may form concentric layers surrounding the structural particle. The structural particle is disposed within the center of the concentric ion layers, or approximately at the center of the concentric ion layers. In some cases, an ion layer may be imperfect such that, for example, a mostly positively charged ion layer comprises a trace quantity of negatively charged ions, and vice versa. However, a positively charged ion layer comprises mostly positively charged ions, and conversely, a negatively charged ion layer comprises mostly negatively charged ions.

In an implementation, the multiple ion nanoparticle 100 includes one or more positive ion layers that comprise one or more positively charged ions. The positive ion layer may comprise only one type of positively charged ion or may include a plurality of different positively charged ions. The positive ion layer is prepared such that at least a majority of the ions within the positive ion layer comprise a positive charge. The positive ion layer may comprise at least 60% positively charged ions. The positive ion layer may comprise at least 70% positively charged ions. The positive ion layer may comprise at least 75% positively charged ions. The positive ion layer may comprise at least 80% positively charged ions. The positive ion layer may comprise at least 85% positively charged ions. The positive ion layer may comprise at least 90% positively charged ions. The positive ion layer may comprise at least 95% positively charged ions. The positive ion layer may comprise at least 96% positively charged ions. The positive ion layer may comprise at least 97% positively charged ions. The positive ion layer may comprise at least 98% positively charged ions. The positive ion layer may comprise at least 99% positively charged ions. The positive ion layer may comprise only positively charged ions.

In an implementation, the multiple ion nanoparticle 100 includes one or more negative ion layers that comprise one or more negatively charged ions. The negative ion layer may comprise only one type of negatively charged ion or may include a plurality of different negatively charged ions. The negative ion layer is prepared such that at least a majority of the ions within the negative ion layer comprise a negative charge. The negative ion layer may comprise at least 60% negatively charged ions. The negative ion layer may comprise at least 70% negatively charged ions. The negative ion layer may comprise at least 75% negatively charged ions. The negative ion layer may comprise at least 80% negatively charged ions. The negative ion layer may comprise at least 85% negatively charged ions. The negative ion layer may comprise at least 90% negatively charged ions. The negative ion layer may comprise at least 95% negatively charged ions. The negative ion layer may comprise at least 96% negatively charged ions. The negative ion layer may comprise at least 97% negatively charged ions. The negative ion layer may comprise at least 98% negatively charged ions. The negative ion layer may comprise at least 99% negatively charged ions. The negative ion layer may comprise only negatively charged ions.

In an implementation, the multiple ion nanoparticle 100 is manufactured in a water-based solution. The multiple ion nanoparticle 100 may specifically be manufactured in a solution comprising ultrapure water. In one example implementation, the structural particle 102 and at least a portion of the plurality of ions 104-114 are disposed in aqueous solution with a moderate dielectric tensoionic salt. The moderate dielectric tensoionic salt may include rubidium chloride. The moderate dielectric tensoionic salt increases surface tension and provides an accelerating or initiating force for driving at least a portion of the plurality of ions 104-114 into formation around the structural particle 102 to form the multiple ion nanoparticle 100. Further to the example implementation, orthosilicic acid is added to the solution. The orthosilicic acid is the hydrated from of a base silica molecule that forms the mineral backbone of the structural particle. The orthosilicic acid is readily soluble in water and will mix in the presence of the additional ions 104-114 to "seed" the cation deposition and form the initial layer surrounding the structural particle to form the multiple ion nanoparticle 100.

Figure 2:
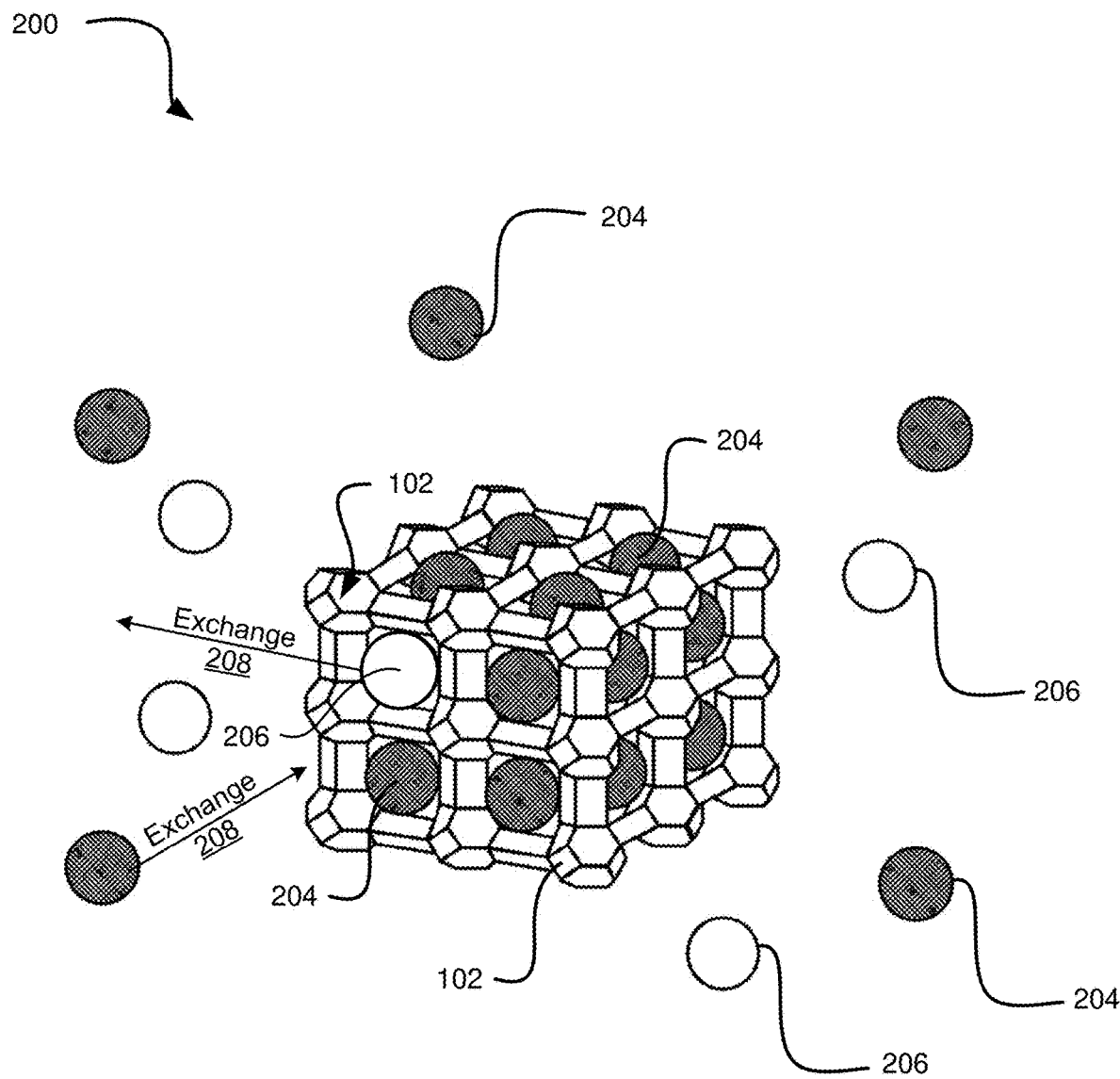
FIG. 2 illustrates an ion exchange nanoparticle including a structural particle comprising a plurality of native ions to be exchanged with known ions.

FIG. 2 illustrates an ion exchange nanoparticle 200. The structural particle 102 described in connection with the multiple ion nanoparticle 100 forms the structure of the ion exchange nanoparticle 200. In an embodiment, the ion exchange nanoparticle 200 (and further, the multiple ion nanoparticle 100) includes a plurality of structural particles 102 arranged in a crystalline structure as illustrated in FIG. 2 or some other multiple-particle structure. The structural particle 102 may include, for example, clay, zeolite, or another mineral.

The structural particle 102 includes a plurality of cation exchange sites and may have a high cation exchange capacity (CEC). The structural particle 102 may be deemed to have a high cation exchange capacity (CEC). The structural particle 102 is deemed to have a high cation exchange capacity if the structural particle 102 comprises 10 centimoles of charge per kilogram (cmolc/kg) or more available for exchange. The structural particle 102 includes one or more native ions 206 that are attracted to the cation exchange sites. The structural particle 102 is processed to synthesize the ion exchange nanoparticle 200 by causing the one or more native ions 206 to exchange 208 with one or more known ions 204. The one or more known ions 204 may include suitable fertilizer ions or agricultural product ions. After processing, the ion exchange nanoparticle 200 includes a shell formed by the structural particle 102 and further includes a plurality of known ions 204 attracted to the cation exchange sites formed by the structural particle 102. In a perfect implementation, each of the native ions 206 is exchanged 206 with a known ion 204.

The ion exchange nanoparticle 200 is further processed to synthesize the multiple ion nanoparticle 100. The multiple ion nanoparticle 100 includes one or more additional known ions (such as, for example, 106, 108, 110, 112, 114) attracted to the structural particle 102 itself and/or the known ions 204 attracted to the cation exchange sites of the structural particle 102. The ion exchange nanoparticle 200 includes one or more layers of ions surrounding the structural particle 102. The one or more layers of ions are attracted to one another through electric charge. In some embodiments, the one or more layers of ions have a strong attraction based on an actual positive or negative charge between layers, and in some other embodiments, the one or more layers of ions have a weak attraction based on polarity within the molecules within each layer. Polar molecules may be stacked within the plurality of layers of ions with their ends oriented towards the opposite charge.

In an embodiment, the ion layers 104-114 include only a combination of positively charged ions and negatively charged ions with no neutral or polar molecules. In an embodiment, the ion layers 104-114 include one or more neutral molecules that comprise polarity giving rise to relative charges throughout the molecule without the molecule having an actual, overall charge. In an embodiment, one or more of the ions 104-114 has a neutral charge, but has polarity giving rise to relative charge across the molecule. In FIG. 1, the components labeled with a positive charge may represent positively charged ions and may alternatively represent neutral molecules with one or more regions of positive polarity. Further in FIG. 1, the components labeled with a negative charge may represent negatively charged ions and may alternatively represent neutral molecules with one or more regions of negative polarity.

Figure 3:
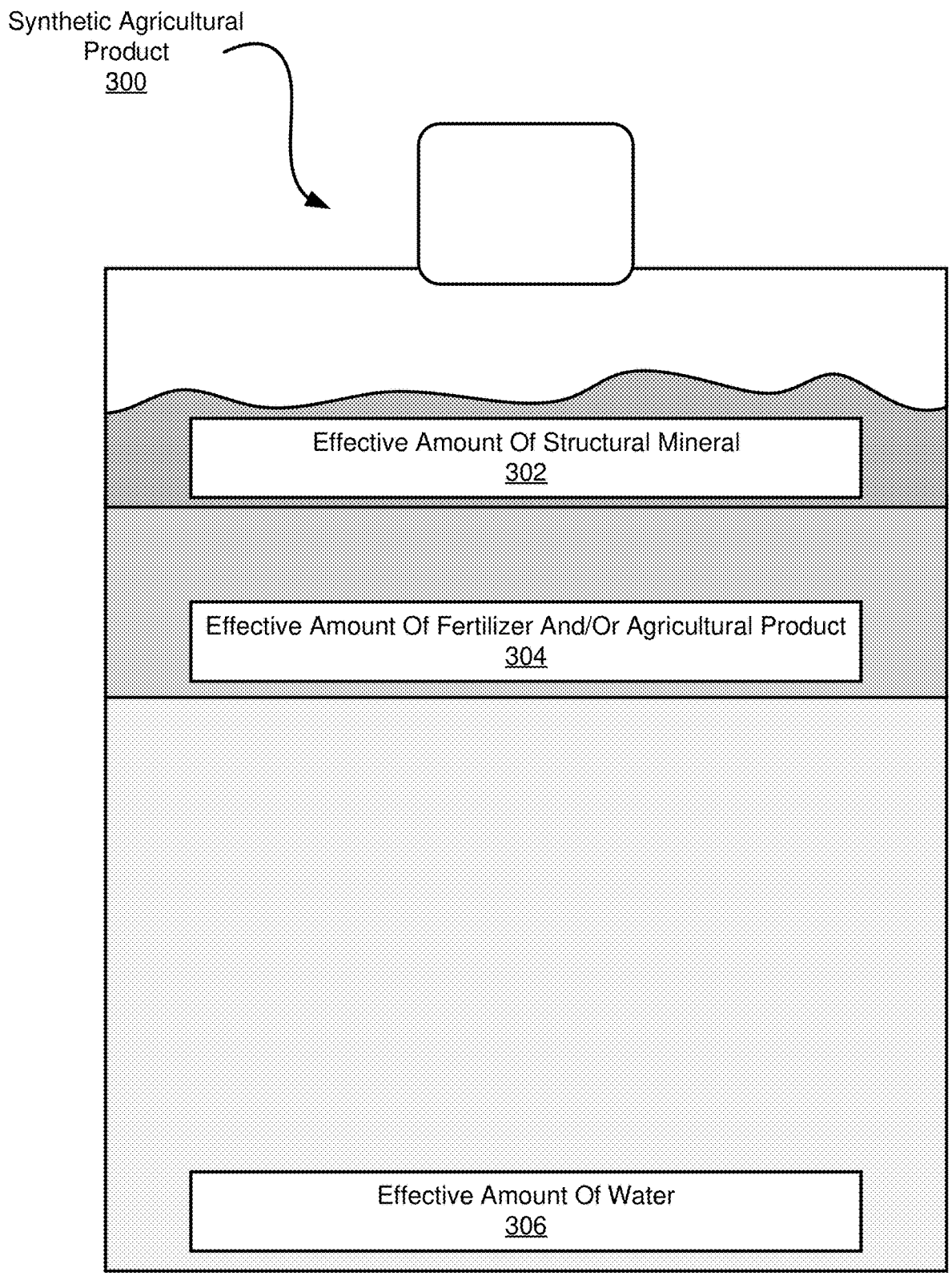
FIG. 3 illustrates an exemplary tank comprising a liquid fertilizer and/or other agricultural product for efficiently delivering ions to a plant by way of a multiple ion nanoparticle and/or ion exchange nanoparticle as described herein.

FIG. 3 illustrates a container comprising a synthetic agricultural product 300. The synthetic agricultural product comprises the multiple ion nanoparticle 100 and/or the ion exchange nanoparticle 200. The synthetic agricultural product 300 is a water-based solution. The synthetic agricultural product 300 includes an effective amount of a structural particle 302 having a high cation exchange capacity, such as the structural particle 102 illustrated in FIGS. 1-2. The synthetic agricultural product 300 further includes an effective amount of a fertilizer and/or agricultural product 304 sufficient to effectuate a response in a plant. The synthetic agricultural product 300 further includes an effective amount of water 306. The relative amounts of the structural particle 302, the fertilizer and/or agricultural product 304, and water 306 are illustrated in FIG. 3. It should be appreciated that the three components 302, 304, 306 will be mixed in solution and are not separated as illustrated in FIG. 3.

The effective amount of the structural particle 302 may be processed by bathing in ultrapure water prior to being included as part of the synthetic agricultural product 300. The structural particle 302 may further be processed such that the particle size of the structural particle 302 is from about 1 nm to about 1000 nm or 1 micrometer.

The effective amount of water 306 is an effective amount sufficient to effectuate a desired result in a plant and maintain the effective amount of the fertilizer and/or agricultural product 304 in suspension and solution. The effective amount of the fertilizer and/or agricultural product 304 and the effective amount of the structural particle 302 may be added into the effective amount of water 306 to create the synthetic agricultural product 300. The synthetic agricultural product comprises the water 306, the fertilizer and/or agricultural product 304, and the structural particle 302.

The synthetic agricultural product 300 is further synthesized by adding energy to the fertilizer and/or agricultural product 304 and the structural particle 302. This raises the energy level of the solution and causes the native ions of the structural particle to exchange with the known ions of the fertilizer and/or agricultural product 304 to product a homogenous mixture of the synthetic agricultural product 300.

The water 306 may be ultrapure water. The structural particle 302 may be bathed in ultrapure water for at least 24 hours prior to being combined with the fertilizer and/or agricultural product 304. In an alternative embodiment, the water 306 is untreated water or potable water.

In an implementation, there are at least two orders of magnitude difference in volume between the effective amount of the fertilizer and/or agricultural product 310 and the effective amount of the synthetic structural particle 320 when the ratio of mineral particle solution is 7 g per 100 mL. More generally, the number of ions from the fertilizer and/or agricultural product should be two to seven orders of magnitude higher than the number of sites available for exchange in the mineral particles. In an implementation, the synthetic structural particle 320 has a high cation exchange capacity and has an equivalents in a range of about 10 Milliequivalents/100 g to about 600 Milliequivalents/100 g.

In an implementation, the effective amount of water 330 falls within a range of about 0.1 gallon to about 6000 gallons.

In an implementation, the effective amount of the fertilizer and/or agricultural product 310 is a liquid fertilizer and/or liquid agricultural product or a combination of fertilizer and/or agricultural product and other beneficial molecules that promote plant health and growth. In an implementation, the effective amount of liquid fertilizer and/or agricultural product falls within a range of about 0.10 gallons to about 50 gallons. In an implementation, the fertilizer and/or agricultural product 310 comprises nanoparticles of the fertilizer.

In an implementation, the effective amount of the structural particle 320 falls within a range of about 5 grams to about 2 kilograms. In an implementation, the synthetic structural particle 320 comprises alumina silicate, silicate, aluminum, or sodium aluminosilicate. In an implementation, the synthetic structural particle 320 comprises montmorillonite, illite, kaolinite, smectite and zeolite. In an implementation, the synthetic structural particle 320 comprises smectite. In an implementation, the synthetic structural particle 320 comprises zeolite. In an implementation, the synthetic structural particle 320 is a carrier of nutrients and other small organic molecules used to protect plants, kill plants, or used as plant growth regulators, such as those used to promote plant health, fruiting, growth, or those used to slow plant growth for use by a cell. In an implementation, the synthetic structural particle 320 comprises both phyllosilicate and tectosilicate. In an implementation, the synthetic structural particle 320 comprises a mineral that has the ability to catalyze or cause or accelerate a reaction by acting as a catalyst.

In an implementation, the synthetic agricultural product 300 further comprises cations from a known source that have been exchanged with the cations of the synthetic structural particle 320. In an implementation, the concentration of mineral particles in solution is within a range of $1 \times 10^{-8}$ mg/mL to $1 \times 10^4$ mg/mL. The concentration of agricultural product ions ranges from 0.01 mg/ml to saturation point.

In an implementation, energy is added into the synthetic agricultural product 300 by mixing the fertilizer and/or agricultural product 310, water 330 and synthetic structural particle 320 using a vortex, high-pressure, or a high pressure cyclonic mixing action.

Figure 4:
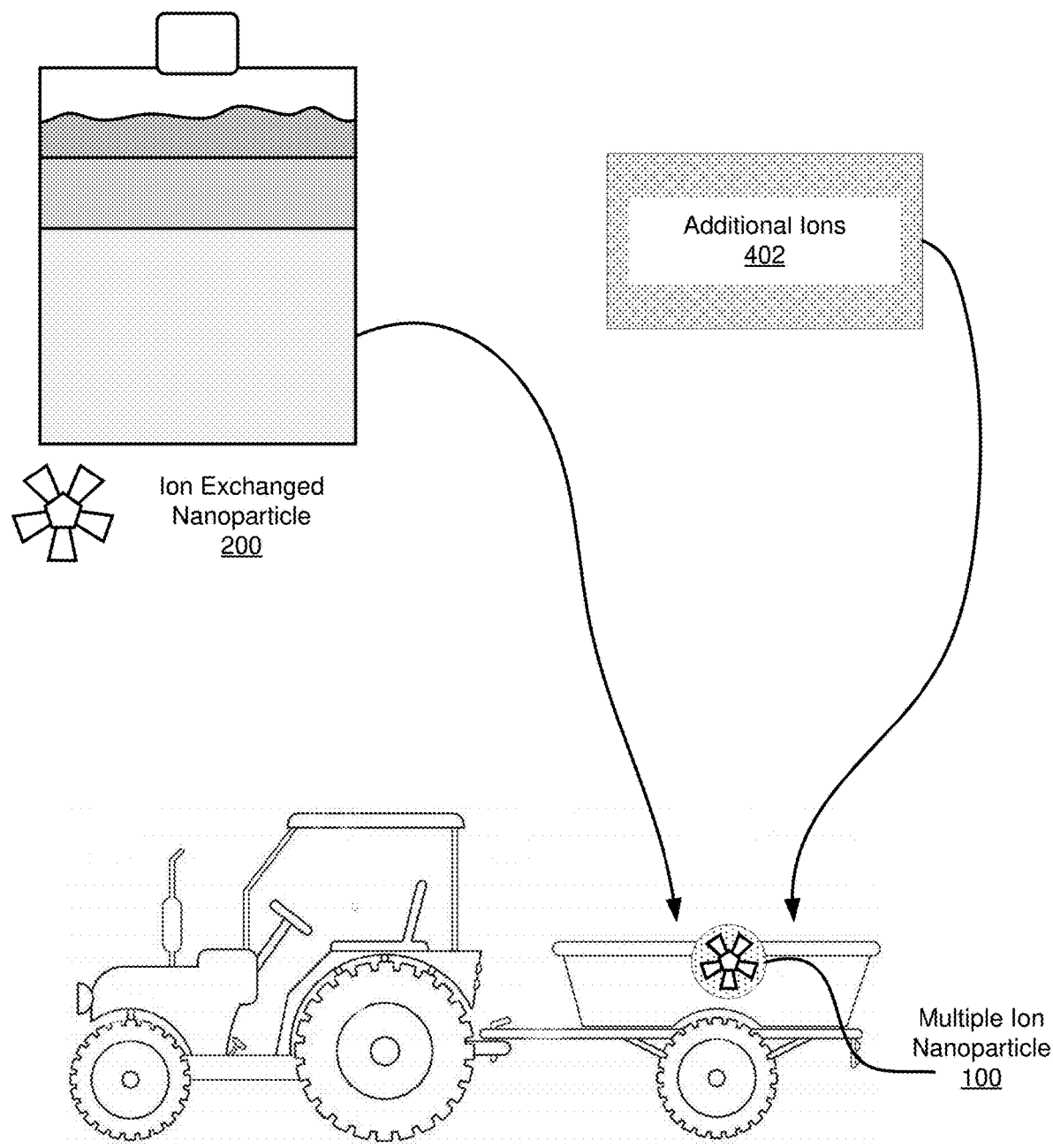
FIG. 4 illustrates an exemplary use-case for applying a multiple ion nanoparticle to plants by combining an ion exchanged nanoparticle with additional ions.

FIG. 4 illustrates an exemplary use-case for applying the multiple ion nanoparticle 100 to plants for accelerating the establishment and growth of the plants. The multiple ion nanoparticle 100 may be prepared in advance or may be prepared immediately prior to application. The multiple ion nanoparticle 100 includes the ion exchanged nanoparticle 200 and further includes one or more additional ions 402 that form a layering effect around the ion exchanged nanoparticle 200. The one or more additional ions 402 may include, for example, the third ion 108, fourth ion 110, fifth ion 112, and sixth ion 114 illustrated in FIG. 1 by way of example. The one or more additional ions 402 may include additional fertilizers and other agricultural products.

The ion exchanged nanoparticle 200 may be stored in a water-based solution as illustrated in FIG. 2. The ion exchanged nanoparticle 200 may be combined with additional ions 402 immediately prior to application or well in advance of application to the plants. The ion exchanged nanoparticle 200 and the additional ions 402 form a layered multiple ion nanoparticle 100 such as the one illustrated in FIG. 1. The multiple ion nanoparticle 100 is applied to plants and enables improved uptake of fertilizer and/or agricultural products by the plants when compared with traditional methods. The structural particle 102 of the multiple ion nanoparticle 100 enables the plants to absorb the fertilizer ions more efficiently and thereby increases the effectiveness of fertilizing the plants.

The multiple ion nanoparticle 100 can pass through the plant's cell walls and be absorbed by the plant. The multiple ion nanoparticle 100 thereby increases the uptake of all ions 104-114 surrounding the structural particle 102 and not only the ions that have assumed the cation exchange sites on the structural particle 102. The ion exchange nanoparticle 200 increases the absorption of the one or more known ions 204 that have taken the place of the one or more native ions 206 attracted to the structural particle 102, and this enables the ion exchange nanoparticle 200 to deliver the one or more known ions 204 to the plant. The multiple ion nanoparticle 100 builds upon the ion exchange nanoparticle 200 and includes additional layers of ions as illustrated in FIG. 1. These additional layers of ions may include additional unique fertilizer ions to be delivered to the plant. The structure of the multiple ion nanoparticle 100 can enter the plant cells and deliver each of the unique fertilizer ions (see 104-114) to the plant and increase the plant's fertilizer uptake of the delivered fertilizer ions.

Figure 5:
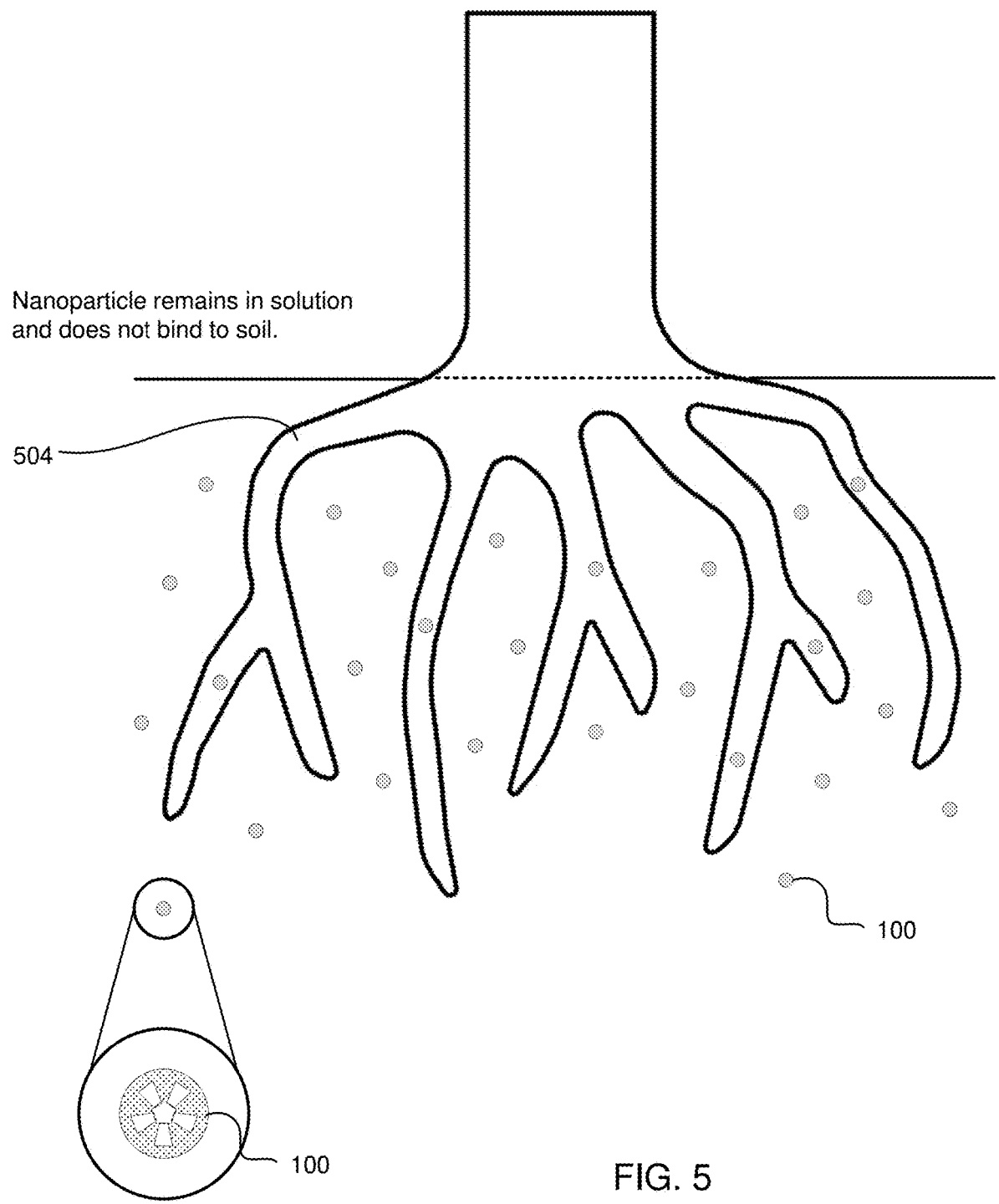
FIG. 5 illustrates an exemplary uptake by a plant of multiple ion nanoparticles.

FIG. 5 illustrates one means for a plant to uptake the multiple ion nanoparticle 100. The multiple ion nanoparticle 100 is stored in a water-based solution and is delivered to plants in this liquid from. The multiple ion nanoparticle 100 does not bind to soil and remains in solution when dispersed throughout the soil. This enables the multiple ion nanoparticle 100 to be readily absorbed by the root system 504 of the plant as the plant absorbs water. The multiple ion nanoparticle 100 can pass through the cell walls of the plant and thereby deliver the fertilizer ions to the plant. This provides increased fertilizer uptake when compared with conventional methods.

Figure 6:
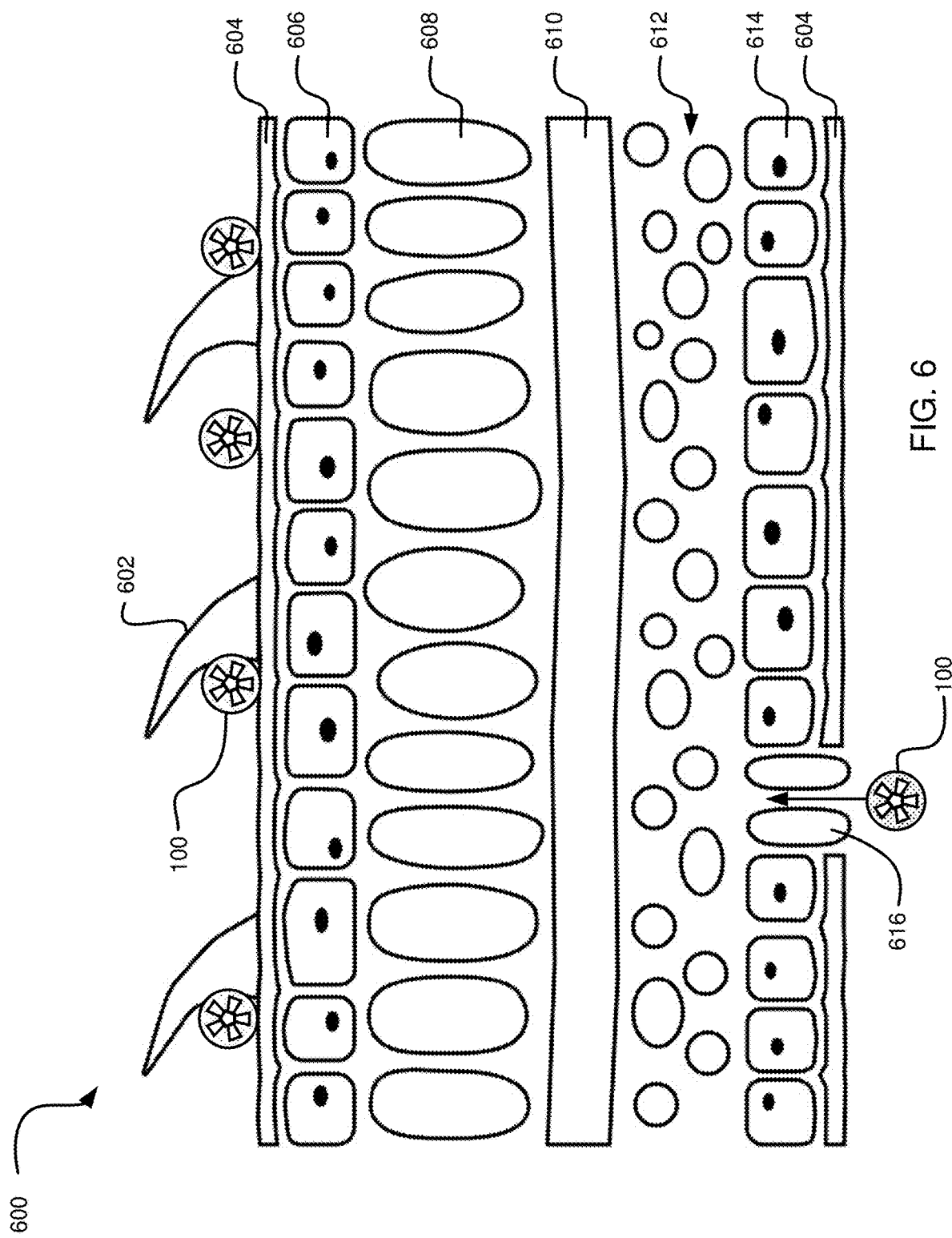
FIG. 6 illustrates an exemplary uptake by a plant of multiple ion nanoparticles.

FIG. 6 illustrates one means for a plant to uptake the multiple ion nanoparticle 100. FIG. 6 illustrates a cross-sectional diagram of an exemplary plant leaf 600. The leaf 600 illustrated in FIG. 6 comprises the typical anatomical structures of most plant leaves, including leaf hair 602, cuticle 604, upper epidermis 606, palisade mesophyll 608, vascular bundle 610, spongy mesophyll 612, lower epidermis 614, and stoma 616. The multiple ion nanoparticle 100 can be absorbed into the plant directly through the plant leaves because the multiple ion nanoparticle 100 can pass through the leaf stoma 616 and pass through the plant's cell walls. The multiple ion nanoparticle 100 may stick to cracks in the cuticle 604 and/or hairs 602 extending out from the leaf. The multiple ion nanoparticle 100 can be absorbed by the cell through the stoma 616 guard cell.

The multiple ion nanoparticle 100 delivers ions to the plants by puncturing the bilayer lipid membrane of the cell walls. The lipid membrane of the cell wall may envelope the multiple ion nanoparticle 100 and accept the fertilizer ions surrounding the structural particle 102.

Figure 7:
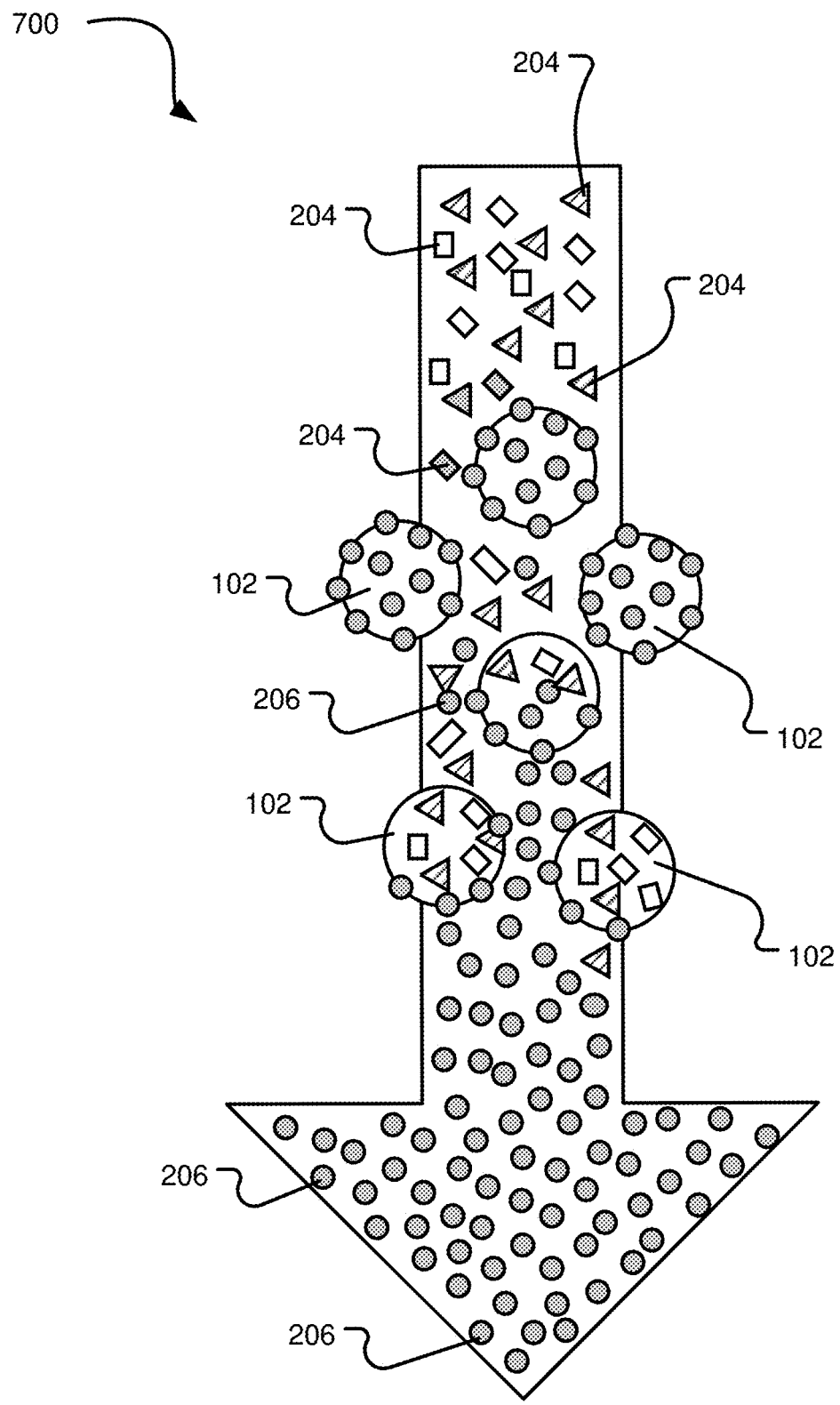
FIG. 7 illustrates an ion exchange process for exchanging native ions on a structural particle with known ions.
Figure 8:
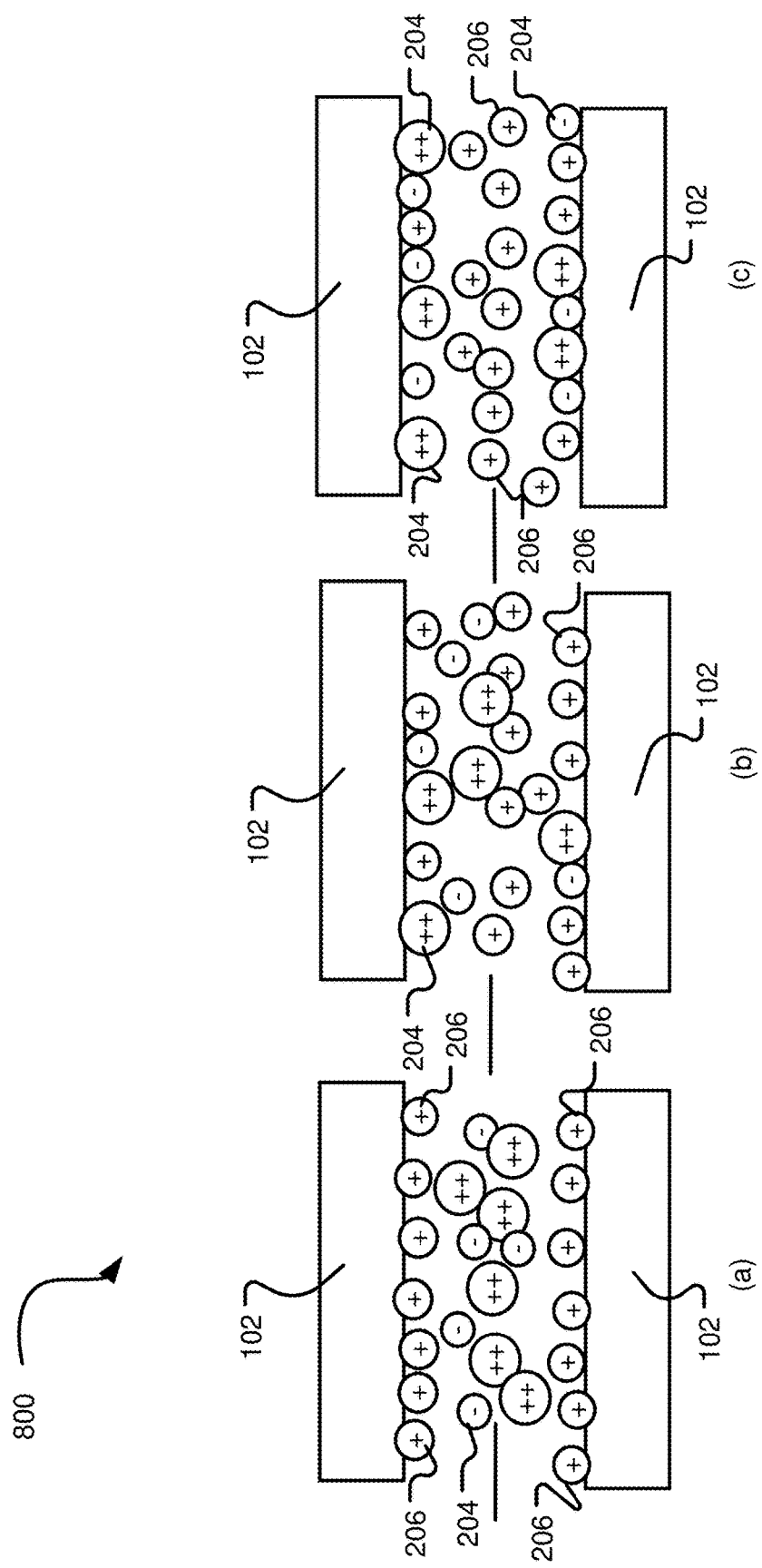
FIG. 8 illustrates an ion exchange process for exchanging native ions on a structural particle with known ions.

FIGS. 7 and 8 are schematic diagrams illustrating the ion exchange processes 700 and 800, respectively, which result in a synthetic agricultural product such as the ion exchange nanoparticle 200 and the multiple ion nanoparticle 100. As illustrated in FIG. 7 for example, a structural particle 102 comprises native ions 206 which may be naturally occurring. The structural particle 102 may be processed or synthesized by exchanging native ions 206 with ions 204 of a known substance, such as a fertilizer and/or agricultural product. It will be appreciated that the ions 204 of the known substance may be introduced to the structural particle 102 through the methods discussed more fully herein. During the process 700, the native ions 206 are exchanged with the ions 204 of the known substance until the structural particle 102 now has more ions 204 of the known substance than native ions 206.

FIG. 8 illustrates the ion exchange process 800, wherein the structural particle 102 is illustrated as a clay material with native ions 206 thereon that are available for exchange with ions 204 of a known substance. It will be appreciated that the clay material is shown for illustration purposes only. It will be appreciated that other structural particles 102 may be used besides a clay material for providing an ion exchange between native ions and known ions without departing from the scope of the disclosure. The native ions 206 are illustrated as cations having a single positive charge (e.g., Na+), whereas the ions 204 of the known substance are illustrated as cations having two positive charges (e.g., Ca2+) and anions having a single negative charge (e.g., Cl−), which are shown for illustration purposes only. It will be appreciated that there are any number of cations or anions that may be exchanged without departing from the scope of the disclosure. The process 800 is illustrated in a time lapse from (a) to (c) for purposes of illustration and clarity. It will be appreciated that the actual amount of time and the number of ions needed for a full process or exchange may be determined based on the teachings and principles of the disclosure.

Figure 9:
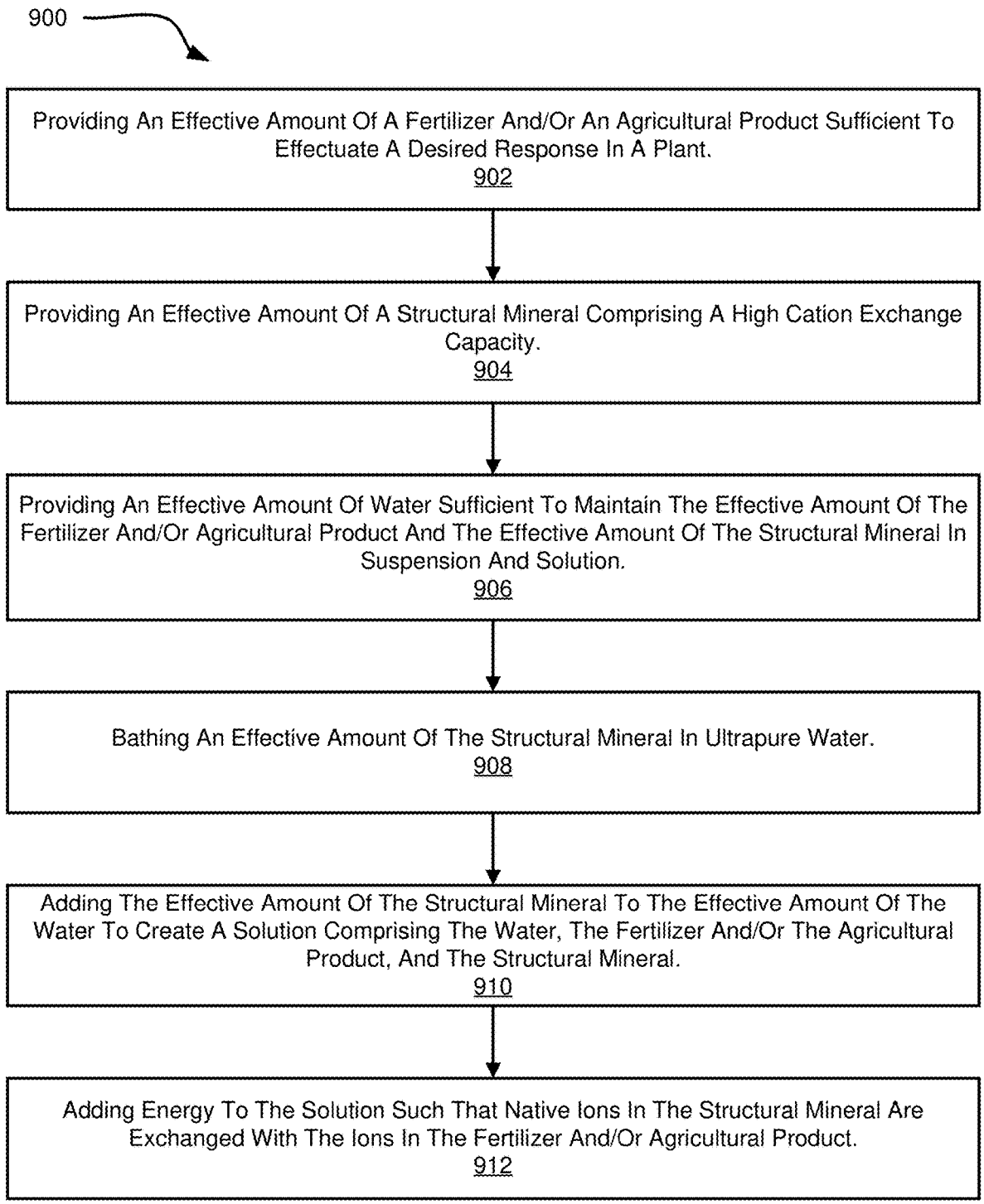
FIG. 9 illustrates a schematic diagram of a method for synthesizing a liquid fertilizer and/or other agricultural product comprising an ion exchange nanoparticle and/or multiple ion nanoparticle.

FIG. 9 is a schematic flow chart diagram of a method 900 for producing a synthetic agricultural product such as an ion exchange nanoparticle 200 and/or a multiple ion nanoparticle 100. The method 900 includes providing at 902 an effective amount of a fertilizer and/or an agricultural product sufficient to effectuate a desired response in a plant. The method 900 includes providing at 904 an effective amount of a structural particle comprising a high cation exchange capacity. The method 900 includes providing at 906 an effective amount of water sufficient to maintain the effective amount of the fertilizer and/or agricultural product and the effective amount of the structural particle in suspension and solution. The method 900 includes bathing at 908 an effective amount of the structural particle in ultrapure water. The method 900 includes adding at 910 the effective amount of the structural particle to the effective amount of the water to create a solution comprising the water, the fertilizer and/or the agricultural product, and the structural particle. The method 900 includes adding at 912 energy to the solution such that the native ions in the structural particle are exchanged with the ions in the fertilizer and/or agricultural product.

As used herein, the phrase "agricultural products" refers broadly to molecules, ions, compounds, solutions, and substances used to protect plants, such as pesticides, molecules, ions, compounds, solutions, and substances used to kill plants, such as herbicides, and molecules, ions, compounds, solutions, and substances used as plant growth regulators, such as those used to promote plant health, fruiting, growth, or those used to slow plant growth.

It will be understood that matching fertilizer and/or agricultural product type and application rates to satisfy a plant's need is an essential component of optimizing plant production. However, different plants in different soil environments, each having different soil types and pHs and other environmental factors, will require varying rates of the major fertilizer nutrients, which are nitrogen (N), phosphate (P2O5), and potassium (potash, K2O). Plants also require the secondary nutrients, Sulphur (S), Calcium (Ca), and Magnesium (Mg), though in lesser quantities than the primary nutrients. Micronutrients are also considered essential though they are needed in still lesser quantities. Micronutrients include Chlorine (Cl), Manganese (Mn), Iron (Fe), Zinc (Zn), Copper (Cu), Molybdenum (Mo), and Nickel (Ni). Another element that is not considered essential but is beneficial is Silicon (Si). Thus, due to variations in soil types, soil test nutrient levels, and nutrient ranges of different plants, different fertilizers, agricultural products, and application rates may be required. Still further, the methods, compositions and agricultural products disclosed herein may further affect the application rates, such that less fertilizer and/or agricultural product may be used to effectuate a response in or delivery the desired result to a plant. In any case, to optimize plant production, a plant's need for nitrogen, phosphate, and potassium (sometimes abbreviated to N—P—K) nutrients along with the other essential and beneficial nutrients must be met without over application. Thus, it will be appreciated that the disclosure may utilize any of these nutrients in any number of possible blends of fertilizer and/or agricultural product types to give the correct N—P—K and other nutrient ratio for a given plant or plant. All of these essential and beneficial nutrients are typically in ionic form and can be exchanged with native ions on a structural particle. It should also be understood that ions and molecules listed above along with other elements, ions, and molecules may be used to kill or limit growth in plant material or other organisms such as insects, bacteria, fungi, viruses, and other organisms by altering the dosage such that it is toxic to those organisms. For example, Manganese levels of 25 to 200 ppm in citrus leaf tissues are considered adequate while levels above 1000 ppm may result in toxicity. In an implementation, the form of the fertilizer is a liquid fertilizer or combination of fertilizer and other beneficial molecules that promote plant health and growth in a liquid form. It will be understood that in an embodiment the effective amount of liquid fertilizer may fall within a range of about 0.10 gallons to about 250 gallons per 250 gallons of finished liquid product without departing from the scope of the disclosure. In an embodiment, for dry, water-soluble products, the dry product may fall within a range of about 0.01 pounds to 1000 pounds per 250 gallons of finished liquid product.

In an implementation, the form of the fertilizer and/or agricultural product is a solid or dry fertilizer and/or agricultural product, or a combination of fertilizer, agricultural products, and/or other beneficial molecules that promote plant health and growth in a solid or dry form.

It will be appreciated that ion exchange (cation exchange or anion exchange) is a chemical process where ions are exchanged between two electrolytes or between an electrolyte solution and a complex. This process includes both cations (ions with a positive charge) and anions (ions with a negative charge). Ion exchangers (complexes) can include synthetic gel polymers or natural substances. It will be appreciated that the structural particle of the disclosure is the complex. Ion exchange on a complex occurs when preexisting ions on a complex are released in exchange for the binding of ions that have a higher affinity for the complex. This process can be reversed by introducing a saturated solution of the lower affinity ions to the complex.

In an implementation, anions may be selectively removed from water by ion exchange because different anions have different affinities, such as shown in this equation form: SO-->NO3-->, Cl->, HCO3->, OH->, F->. For cations the affinity hierarchy is: (Pb++>, Ca++>, Mg++>, Na+>, Li+>, H+).

Continuing to refer to FIG. 9, the method 900 may include providing an effective amount of a structural particle that comprises a high cation exchange capacity. Cation exchange capacity may be determined by calculating a value that is an estimate of a substance's ability to attract, retain, and exchange cation elements. Cation exchange capacity is reported in milliequivalents (meq) per 100 grams of a substance, which may be a soil substance, structural particle, or other inorganic matter (meq/100 g). A meq is the number of ions that total a specific quantity of electrical charges. For example, a meq of potassium ($K^+$) ions is approximately $6 \times 10^{20}$ positive charges; whereas with calcium a meq of Calcium (Ca++) is also $6 \times 10^{20}$ positive charges, but only $3 \times 10^{20}$ ions because each calcium ion has two positive charges. Although the minerals discussed here have high cation exchange capacity values, they do have a level of anion exchange capacity as well and the anion exchange can be utilized in the same way as the cation exchange. The number of cations supplied by the fertilizer and/or agricultural product source should outnumber the number of cations occurring naturally on the structural particle, such that the probability for the native ion being exchanged for a fertilizer and/or agricultural product cation is high, and the probability of the original cation being reintroduced onto the structural particle is extremely low. Since most fertilizers and/or agricultural products applied in an agricultural or horticultural setting are often a mixture of two or more primary, secondary, and micro nutrients, and that the combinations are many and varied, it is difficult to describe all of the possibilities, but the ions (both positive and negative) supplied by the fertilizer and/or agricultural product may be at least two orders and may be equal to or up to seven orders of magnitude more abundant than the ions available for exchange (both positive and negative) natively occurring on the structural particle. Exception to this rule may be when the known ions in the fertilizer and/or agricultural product supplied have a single charge (especially positive ions) and have an extremely high affinity for the soil particle—in other words, once the known ions in the fertilizer and/or agricultural product are exchanged with the native mineral ions the negatively (for example) charged soil particle once ionically bound to the fertilizer and/or agricultural product cation (for example) would represent an extremely low energy state such that exchange is extremely unlikely.

It will be understood that cations held on the soil substance, structural particle and inorganic matter particles in soil substances and structural particles can be replaced by other cations. Thus, the ions in these soil substances, structural particles, and inorganic matter are exchangeable. By way of example, iron can be replaced or exchanged by cations, such as calcium or potassium, and vice-versa. The total number of cations a soil substance, a structural particle or other organic matter or substance can hold—or its total negative charge—is the cation exchange capacity. The higher the cation exchange capacity, the higher the negative charge and the more cations that can be held. High cation exchange capacity may be defined as 12 meq up to 600 meq.

It will be appreciated that the structural particle may be in the consolidated or aggregate form. In an implementation, the structural particle is a zeolite of the zeolite group in the tectosilicate family and can be naturally occurring or synthetically derived. Zeolites are crystalline, hydrated aluminosilicates that contain alkali and alkaline-earth metals. Their crystal framework is based upon a three-dimensional network of $SiO_4$ tetrahedra with all four oxygens shared by an adjacent tetrahedral. The alkali and alkaline earth cations are loosely bound within this structure (by ionic bonding) and can be exchanged by other cations or molecular water. Most zeolites can be dehydrated and rehydrated without any change in volume. The important physical and chemical properties of zeolites are high degree of hydration, low density and large void volume when dehydrated, cation exchange properties, uniform molecular-sized channels in the dehydrated crystals, ability to adsorb gases and vapors, and catalytic properties.

It will be appreciated that molecular sieves are materials that can selectively adsorb molecules on the basis of their size, shape, or electrical charge. Commercial applications of zeolites are based on the following properties: molecular sieving, ion exchange, adsorption, and catalysis. Most zeolites are molecular sieves, but not all molecular sieves are zeolites. Activated carbon, activated clays, aluminum oxide, and silica gels are also molecular sieves. Activated synthetic and natural zeolite molecular sieve products, however, have displaced many of these substances because of their selectivity.

It will be appreciated that the basic structure of zeolites comprises (AlSi)O4 tetrahedra, wherein each oxygen atom is shared by two tetrahedra: thus, the atomic ration O:(Si+Al) is 2. The net negative charge of the structure is balanced by exchangeable cations, which are loosely held within the central cavities by weak ionic bonding and surrounded by water molecules. The cavities form a continuous network of channels that give this mineral the capabilities to adsorb water and other ionic solutions readily. The zeolite may comprise a hydrated sodium calcium aluminosilicate. Further, the structural particle may be made up of frameworks of AlO4 and SiO4 tetrahedra, which have large interconnecting spaces known as channels. Channels are filled with water that can be removed through heating without affecting the aluminosilicate structures.

It will be appreciated that the dimensions and orientation of void spaces and the interconnected channels in dehydrated zeolites are important in determining the physical and chemical properties (see Figure of zeolite structure). The three types of channel systems identified are a one-dimensional system, a two-dimensional system, and two varieties of three-dimensional, intersecting systems. It will be appreciated that once there has been an exchange of known ions (such as ions commonly found in fertilizers and/or agricultural products) with the native or unknown ions at the exchange sites of the structural particle, a vortex, high-pressure, or a high pressure cyclonic mixing action may be used to fill the channels or voids in the structural particle with known ions, such as fertilizers and/or agricultural products or other nutrients, to create a structural particle with known ions exchanged at the exchange sites as well as filling, at least in part, the channels of the structural particle through diffusion. Since the preexisting ions in the native zeolite are part of the native chemical structure, exchanging those ions with new known ions results in a new and synthetic chemically altered formula that describes the makeup of the zeolite, and as such is considered partially synthetic. It will be understood that in some structural particles, such as clay, there may not be any channels or voids where additional ion exchange can take place, but instead there may only be exchange sites. Conversely, in other structural particles, such as zeolite, there may be both exchange sites and channels or voids where additional ion exchange can take place between the native ions in the structural particle and the known ions in the fertilizer and/or agricultural product and/or another nutrient.

It will be appreciated that the character of the water in hydrated zeolite crystals varies, because it can include molecular clustering or direct bonding between the cations and the framework oxygen molecules. The inter-crystalline volume that may be occupied by water constitutes up to 50% of the volume of the crystal. The adsorption capacity of a zeolite is generally related to the free space or pore volume as determined by the quantity of contained water when fully hydrated at a standard temperature and humidity. Adsorption and ion exchange capacities in both hydrated and dehydrated zeolites are related to the characteristics of the channel openings. The apertures are bounded by oxygen atoms of the connected tetrahedral. The limiting size of the aperture is governed by the size of the rings, which contain 6, 8, 10, or 12 oxygen atoms.

It will be appreciated that the chemical properties of zeolites make use of one or more of their chemical properties, which include adsorption, cation exchange, and dehydration or rehydration. These properties are functions of the specific crystal structure of each mineral, its framework, and its cationic composition.

It will be appreciated that crystalline zeolites are unique adsorbent materials. The large central cavities and entry channels (see Figure of generalized zeolite structure) of the zeolite are filled with water molecules that form hydration spheres around the exchangeable cations. If the water is removed, molecules having cross-sectional diameters small enough for them to pass through the entry channels are readily adsorbed in the channels and central cavities and can be held there until they are removed via diffusion. Molecules too large to pass through the entry channels are excluded, which result in the molecular sieving property of most zeolites.

It will be appreciated that exchangeable cations of a zeolite are loosely bonded to the tetrahedral framework and can be easily exchanged and removed by washing with a strong solution of another cation. The meq/100 g or some zeolite minerals is between 200 meq/100 g and 500 meg/100 g. Crystalline zeolites are very effective ion exchangers. The ion exchange capacity is basically a function of the degree of substitution of aluminum for silicon in the framework structure. The greater the substitution, the greater the charge deficiency, and the greater the number of alkali or alkaline earth cations required for electrical neutrality. Cation exchange behavior also depends on other factors, including: the concentration of the specific cation in the solution; the temperature; the nature of the cation species (e.g., size, charge); and the structural characteristics of the particular zeolite. Cations can be trapped in structural positions that are relatively inaccessible, thereby reducing the effective ion exchange capacity. Cation sieving may also take place if the cation in solution is too large to pass through the entry ports into the central cavities. Unlike most non-crystalline ion exchangers, the framework of a zeolite defines its selectivity toward competing ions, and different structures offer different sites for the same cation. The hydration strength of some ions prevents their close approach to the seat of charge within the framework. In many zeolites, ions having low field strength are more tightly held and are more selectively taken up from solutions than the other ions.

It will be appreciated that zeolites exhibit no major changes during dehydration; they do exhibit continuous weight loss as a function of temperature and will rehydrate. If the temperature required for complete dehydration is exceeded, the zeolite structure collapses, and rehydration cannot occur. Most natural zeolites are thermally stable from 250° C. to 400° C. (482° F. to 752° F.). Zeolites with higher silica contents, such as mordenite and clinoptilolite, collapse at temperatures greater than 650° C. (1,204° F.).

It will be appreciated that clay minerals form flat hexagonal sheets similar to the mica group. Clay minerals may be hydrous aluminum phyllosilicates, sometimes with variable amounts of iron, magnesium, alkali metals, alkaline earths, and other cations. Clay minerals are common in fine-grained sedimentary rocks such as shale, mudstone, and siltstone and in fine-grained metamorphic slate and phyllite. Clay minerals are usually (but not necessarily) ultrafinegrained (normally considered to be less than 2 micrometers in size on standard particle size classifications) and so may require special analytical techniques for their identification and study. These include x-ray diffraction, electron diffraction methods, various spectroscopic methods such as Mossbauer spectroscopy, infrared spectroscopy, Raman spectroscopy, and SEM-EDS or automated mineralogy processes. These methods can be augmented by polarized light microscopy, a traditional technique establishing fundamental occurrences or petrologic relationships.

Clay minerals may be classified as 1:1 or 2:1, because they are built of tetrahedral silicate sheets and octahedral hydroxide sheets. A 1:1 clay would consist of one tetrahedral sheet and one octahedral sheet, and examples would be kaolinite and serpentine. A 2:1 clay would consist of an octahedral sheet sandwiched between two tetrahedral sheets, and examples are talc, vermiculite, and montmorillonite.

Clay minerals may include the following groups. 1) The Kaolin group includes the minerals kaolinite, dickite, halloysite, and nacrite (polymorphs of Al2Si2O5(OH)4). Some sources include the kaolinite-serpentine group due to structural similarities. 2) The Smectite group includes dioctahedral smectites, such as montmorillonite and nontronite, and trioctahedral smectites, for example saponite. 3) The Illite group includes the clay-micas. Illite is the only common mineral. 4) The Chlorite group includes a wide variety of similar minerals with considerable chemical variation. Other 2:1 clay types exist such as, for example, sepiolite or attapulgite, are clays with long water channels internal to their structure.

It will be appreciated that mixed layer clay variations exist for most of the above groups. Ordering is described as random or regular ordering and is further described by the range or reach. Such order descriptions may include an R1 ordered illite-smectite, for example. This clay type would be ordered in an ISIS IS fashion. R0, on the other hand, may include or describe random ordering. Other advanced ordering types may also be found, such as R3, etc. Mixed layer clay minerals, which are perfect R1 types often get their own names. For example, R1 ordered chlorite-smectite is known as corrensite, and R1 illite-smectite is known as rectorite.

In an implementation, the structural particle may comprise one or more of alumina silicate, silicate, aluminum, sodium aluminosilicate or other tuff material. In an implementation, the structural particle comprises one or more of montmorillonite, illite, kaolinite, smectite, zeolite, hydrated sodium calcium aluminosilicate (HSCAS), and vermiculite. In an implementation, the structural particle comprises smectite. In an implementation, the structural particle comprises zeolite. In an implementation, the zeolite structural particle is a carrier of nutrients and other small organic and inorganic molecules via ion exchange and adsorption inside the channels (formed by the crystalline structure). Zeolite channels may carry ions and small molecules used to protect plants, kill plants, or used as plant growth regulators, such as those used to promote plant health, fruiting, growth, or those used to slow plant growth for use by a cell.

In an implementation, the structural particle having a high cation exchange capacity has an equivalents in a range of about 12 Milliequivalents/100 g to about 600 Milliequivalents/100 g.

The concentration of mineral particles in solution is within a range of $1\times10^{-8}$ mg/ml to $1\times10^{4}$ mg/ml. The concentration of agricultural product ions ranges from 0.01 mg/ml to saturation point.

Continuing to refer to FIG. 9, the method 900 may further comprise providing an effective amount of water sufficient to effectuate a desired result in a plant and maintain the effective amount of a fertilizer and/or agricultural product and the effective amount of the structural particle in suspension and solution at 130. The effective amount of water may fall within a range of about 0.1 gallon to about 6000 gallons.

The method 900 may further comprise bathing an effective amount of the structural particle in ultrapure water at 908. In an implementation of the method, the step of bathing the effective amount of the structural particle in ultrapure water comprises bathing the structural particle for at least 24 hours. The process of bathing the structural particle may assist in preparing the structural particle by removing native ions and molecules held by water in the channels through diffusion. Ultrapure water may be used to make the ions in the soil substance, structural particle, or other organic material readily available for exchange. Thus, when the soil substance, structural particle, or other organic material is bathed in ultrapure water, the ions in the structural particle are exposed or otherwise made readily available for ion exchange with another known substance. Thus, in an implementation, the method and system of the disclosure may comprise exchanging cations from the structural particle with selected cations of a known source. For example, in an embodiment, the method 900 comprises bathing an effective amount of the soil substance, the structural particle or other inorganic material directly in the fertilizer or agricultural product. When the soil substance, structural particle, or other organic material is bathed in fertilizer or other known or desired source of ions, the ions in the soil substance, structural particle, or other organic material are exposed or otherwise made readily available for ion exchange with another known substance.

The method 900 may further comprise heating the structural particle (zeolite) with a heat source to create a dehydrated structural particle. In an implementation, the heat source is an oven. In an implementation the heat source is a heat lamp. This step ensures that the zeolite channels are filled with a concentrated fertilizer and/or agricultural product solution.

The method 900 shown in FIG. 9 may further comprise creating a pretreated solution by adding the dehydrated structural particle to a concentrated fertilizer and/or agricultural product solution at 147, thus introducing a high concentration of desired ions into the channels and at the ion exchange sites.

The method 900 may comprise adding the effective amount of the fertilizer and/or agricultural product into the effective amount of water; and adding the effective amount of the pretreated mineral solution into the effective amount of the water, thereby creating a solution of the water, the fertilizer and/or agricultural product, and the structural particle.

The method 900 may comprise adding energy into the solution to thereby raise an energy level of known ions in the fertilizer and/or agricultural product and native ions in the structural particle, such that the native ions in the structural particle are exchanged with the known ions to produce a chemically altered and synthetic zeolite and a homogenous mixture of liquid fertilizer and/or agricultural product. It will be appreciated that mechanical energy, chemical energy, electromagnetic energy, or other forms of energy may be added to the method, system, or product of the disclosure without departing from the scope of the disclosure. In an implementation, energy may be added into the method, system, or product of the disclosure through high-pressure or through a high pressure cyclonic mixing action. In an implementation, energy may be added into the solution by mixing the fertilizer and/or agricultural product, water and structural particle using the high pressure cyclonic mixing action.

The method 900 may further comprise providing an effective amount of ultrapure water sufficient to effectuate a desired result in a plant and maintain the effective amount of liquid fertilizer and/or agricultural product and the effective amount of the structural particle in suspension and solution. In an implementation of the method, the method 900 may further comprise providing an effective amount of double distilled water sufficient to effectuate a desired result in a plant and maintain the effective amount of liquid fertilizer and/or agricultural product and the effective amount of the structural particle in suspension and solution. In an implementation of the method, the method 900 may further comprise providing an effective amount of untreated water sufficient to effectuate a desired result in a plant and maintain the effective amount of liquid fertilizer and/or agricultural product and the effective amount of the structural particle in suspension and solution. In an implementation of the method, the method 900 may further comprise providing an effective amount of potable water sufficient to effectuate a desired result in a plant to a plant and maintain the effective amount of liquid fertilizer and/or agricultural product and the effective amount of the structural particle in suspension and solution.

In an implementation, a method may add to a 200-gallon mixing tank the following: about 10-20 gallons water; about 1 gallon of liquid fertilizer and/or agricultural product; and about 100 mL of a solution of structural particle, which has been processed by being bathed and soaked in ultrapure water. It will be appreciated that such a bath and soak may be for at least 24 hours because the ultrapure water is hydrating the minerals within the structural particle. It will be appreciated that, in an embodiment, there are about 7 grams of structural particle in the 100 mL solution of the structural particle. Thereafter, the 200-gallon tank may be filled with water (which may be any type of water, such as ultrapure water, double distilled water, untreated water, potable water, and the like). There is an ion exchange that occurs between known ions with ions in the structural particle. The method adds high energy mixing such that there is more opportunity for the ions to exchange with each other during the process, such that all or nearly all cations on the mineral particles are exchanged that are available for such an exchange.

EXAMPLES

The following examples pertain to further embodiments.

Example A is a method of preparing a multiple ion nanoparticle. The method includes preparing a solution comprising water, rubidium chloride, orthosilicic acid, a plurality of structural particles, and a plurality of fertilizer ions.

Example B is a method of preparing a multiple ion nanoparticle. The method includes preparing a solution comprising water, 1 mM rubidium chloride, 15 mM orthosilicic acid, a plurality of structural nanoparticles, and a plurality of fertilizer ions. The method includes agitating the solution.

Example C is a method of preparing a multiple ion nanoparticle. The method includes preparing a solution comprising a dielectric tensoionic salt, a structural particle, and a plurality of fertilizer ions. The method includes agitating the solution.

Example 1 is a composition. The composition comprises a multiple ion nanoparticle comprising a structural particle with a high cation exchange capacity. The multiple ion nanoparticle includes a plurality of ions forming one or more layers of ions around the structural particle. The one or more layers of ions around structural particle is such that the plurality of ions comprises a plurality of a first ion having a positive charge, a plurality of a second ion having a negative charge, and a plurality of a third ion.

Example 2 is a composition as in Example 1, further comprising an aqueous solution, wherein the multiple ion nanoparticle maintains the one or more layers of ions around the structural particle even when in aqueous solution.

Example 3 is a composition as in any of Examples 1-2, wherein the water solution comprising ultrapure water.

Example 4 is a composition as in any of Examples 1-3, wherein the structural particle is zeolite.

Example 5 is a composition as in any of Examples 1-4, wherein the plurality of ions comprises fertilizer ions and/or other agricultural products.

Example 6 is a composition as in any of Examples 1-5, wherein the first ion comprises one of a group comprising potassium, calcium, zinc, iron, phosphorous, Sulphur, manganese, copper, molybdenum, nickel, silicon, and magnesium.

Example 7 is a composition as in any of Examples 1-6, wherein the second ion comprises one of a group comprising nitrogen, phosphorous, phosphate, chlorine, silicon, and Sulphur, Example 8 is a composition as in any of Examples 1-7, wherein the third ion comprises a positive charge.

Example 9 is a composition as in any of Examples 1-8, wherein the third ion comprises a negative charge.

Example 10 is a composition as in any of Examples 1-9, further comprising a plurality of a fourth ion, wherein the plurality of the third ion encircles the structural particle, and wherein the plurality of the fourth ion encircles the plurality of the third ion.

Example 11 is a composition as in any of Examples 1-10, further comprising a plurality of a fifth ion, wherein the plurality of the third ion encircles the structural particle, and wherein the plurality of the fourth ion encircles the plurality of the third ion, and wherein the plurality of the fifth ion encircles the plurality of the fourth ion.

Example 12 is a composition as in any of Examples 1-11, wherein the third ion comprises ammonium.

Example 13 is a composition as in any of Examples 1-12, wherein the third ion comprises phosphate.

Example 14 is a composition as in any of Examples 1-13, wherein the composition comprises an effective amount of the plurality of the first ion and the plurality of the second ion for effectuating a desired result in a plant.

Example 15 is a composition as in any of Examples 1-14, further comprising an effective amount of water for maintaining the multiple ion nanoparticle in solution.

Example 16 is a composition as in any of Examples 1-15, wherein the first ion, the second ion, and the third comprises a fertilizer and/or other agricultural product.

Example 17 is a composition as in any of Examples 1-16, wherein one or more of the plurality of the first ion and the plurality of the second ion replaces a native ion attracted to a cation exchange site on the structural particle.

Example 18 is a composition as in any of Examples 1-17, wherein the structural particle is bathed in ultrapure water prior to being combined with the plurality of the first ion, the plurality of the second ion, or the plurality of the third ion.

Example 19 is a composition as in any of Examples 1-18, wherein the multiple ion nanoparticle can pass through a plant cell wall and can be absorbed through a leaf stoma guard cell.

Example 20 is a composition as in any of Examples 1-19, wherein the multiple ion nanoparticle delivers the plurality of the first ion, the plurality of the second ion, and the plurality of the third ion to a plant by puncturing a leaf cell membrane and releasing at least a portion of the plurality of the first ion, the plurality of the second ion, and the plurality of the third ion into an interior of a plant cell.

Example 21 is a composition as in any of Examples 1-20, wherein the structural particle and one or more of the plurality of the first ion or the plurality of the second ion forms an ion exchange nanoparticle, wherein the ion exchange nanoparticle is formed by replacing native ions attracted to one or more cation exchange sites on the structural particle with one or more of the plurality of the first ion or the plurality of the second ion.

Example 22 is a composition as in any of Examples 1-21, wherein the ion exchange nanoparticle is combined in an aqueous solution with the plurality of the third ion to form the multiple ion nanoparticle.

Example 23 is a composition as in any of Examples 1-22, wherein the multiple ion nanoparticle is delivered to a plant to effectuate a desired result in the plant, and wherein the multiple ion nanoparticle does not bind to soil and remains in aqueous solution when in soil such that the multiple ion nanoparticle is readily absorbed by the plant.

Example 24 is a composition as in any of Examples 1-23, wherein the multiple ion nanoparticle releasably attaches to one or more of a crack in a plant leaf cuticle or a hair of the plant leaf when delivered to a plant for effectuating a desired result in the plant.

Example 25 is a composition as in any of Examples 1-24, wherein the multiple ion nanoparticle is synthesized by exchanging native ions attracted to the structural particle with one or more of the plurality of the first ion, the plurality of the second ion, or the plurality of the third ion.

Example 26 is a composition as in any of Examples 1-25, wherein a volume of the structural particle and the cumulative volume of the plurality of the first ion and the plurality of the second ion is such that the cumulative number of first ions and second ions available to be exchanged on the structural particle is at least two orders of magnitude greater than the number of cation exchange sites on the structural particle.

Example 27 is a composition as in any of Examples 1-26, wherein the multiple ion nanoparticle is synthesized by exchanging native ions attracted to cation exchange sites on the structural particle with the plurality of first ions having the positive charge, wherein the native ions have a positive charge.

Example 28 is a composition as in any of Examples 1-27, wherein the multiple ion nanoparticle is synthesized by combining an ion exchange nanoparticle comprising the structural particle and one or more of the plurality of the first ions and the plurality of the second ions with a starter fertilizer, wherein the starter fertilizer comprises the plurality of the third ion.

Example 29 is a composition as in any of Examples 1-28, wherein the starter fertilizer comprises one or more of nitrogen, phosphorous, potassium, or ammonium polyphosphate.

Example 30 is a composition as in any of Examples 1-29, wherein the multiple ion nanoparticle comprises a plurality of ions attracted to cation exchange sites on the structural ion, and wherein the multiple ion nanoparticle further comprises a plurality of ion layers surrounding the structural ion.

Example 31 is a composition as in any of Examples 1-30, wherein the structural particle comprises the high cation exchange capacity and has an equivalents in a range of about 10 Milliequivalents/100 g to about 600 Milliequivalents/100 g.

Example 32 is a composition as in any of Examples 1-31, further comprising an effective amount of water within a range of about 0.1 gallons to about 6000 gallons.

Example 33 is a composition as in any of Examples 1-32, wherein the composition is a liquid fertilizer and/or other agricultural product.

Example 34 is a composition as in any of Examples 1-33, wherein the liquid fertilizer and/or other agricultural product falls within a range of about 0.10 gallons to about 50 gallons.

Example 35 is a composition as in any of Examples 1-34, wherein the structural particle falls within a range of about 5 grams to about 2 kilograms.

Example 36 is a composition as in any of Examples 1-35, wherein the structural particle comprises one or more of alumina silicate, silicate, aluminum, sodium aluminosilicate, or other tuff material.

Example 37 is a composition as in any of Examples 1-36, wherein the structural particle comprises one or more of montmorillonite, illite, kaolinite, smectite, or zeolite.

Example 38 is a composition as in any of Examples 1-37, wherein the structural particle is a carrier of nutrients and other organic molecules used to protect plants, mill plants, or used as plant growth regulators to promote plant health, fruiting, growth, or used to slow plant growth for use by a plant cell.

Example 39 is a composition as in any of Examples 1-38, wherein a diameter of any of the first ion, the second ion, and the third ion falls within a range of about 1 nanometer to about 1000 nanometers.

Example 40 is a composition as in any of Examples 1-39, wherein the structural particle comprises each of phyllosilicate and tectosilicate.

Example 41 is a composition as in any of Examples 1-40, wherein energy is added to the structural ion and one or more of the plurality of the first ion, the plurality of the second ion, and the plurality of the third ion using a vortex.

Example 42 is a composition as in any of Examples 1-41, wherein the structural particle naturally comprises native ions having a high cation exchange capacity, and wherein one or more of the plurality of the first ion, the plurality of the second ion, and the plurality of the third ion are configured to be exchanged with the native ions of the structural particle.

Example 43 is a composition as in any of Examples 1-42, wherein the structural particle comprises a plurality of channels, wherein the plurality of channels are at least partially filled with one or more of the plurality of the first ion, the plurality of the second ion, and the plurality of the third ion by a high pressure mixing action.

Example 44 is a composition as in any of Examples 1-43, wherein the structural particle is bathed in fertilizer and/or other agricultural product.

Example 45 is a composition as in any of Examples 1-44, wherein the composition is provided to a plant to effectuate a desired result in the plant, and wherein at least a portion of the plurality of the first ion, the plurality of the second ion, and the plurality of the third ion are delivered and carried to a cell of the plant where at least a portion of the plurality of the first ion, the plurality of the second ion, and the plurality of the third ion are absorbed by the cell of the plant or are carried by the structural particle directly into the cell of the plant.

Example 46 is a composition as in any of Examples 1-45, wherein one or more of: the first ion having the positive charge is an overall neutrally charged molecule comprising a region of positive polarity; and/or the second ion having the negative charge is an overall neutrally charged molecule comprising a region of negative polarity.

Example 47 is a method for synthesizing a liquid fertilizer and/or other agricultural product. The method includes providing an effective amount of a fertilizer and/or other agricultural product comprising one or more ions sufficient to effectuate a desired result in a plant. The method includes providing an effective amount of a structural particle comprising a high cation exchange capacity. The method includes providing an effective amount of water sufficient to maintain the effective amount of the fertilizer and/or other agricultural product and the effective amount of the structural particle in suspension and solution.

Example 48 is a method as in Example 47, further comprising forming a solution by adding the effective amount of the fertilizer and/or other agricultural product and the effective amount of the structural particle into the effective amount of water.

Example 49 is a method as in any of Examples 47-48, further comprising exchanging native ions in the structural particle with the one or more ions of the fertilizer and/or other agricultural product by adding energy to the solution to raise an energy level of the solution generate a synthetic liquid fertilizer and/or other agricultural product.

Example 50 is a method as in any of Examples 47-49, wherein there are at least two orders of magnitude difference between the one or more ions of the fertilizer and/or other agricultural product and ion exchange sites on the effective amount of the structural particle.

Example 51 is a method as in any of Examples 47-50, wherein the structural particle comprises the high cation exchange capacity and has an equivalents in a range of about 10 Milliequivalents/100 g to about 600 Milliequivalents/100 g.

Example 52 is a method as in any of Examples 47-51, wherein the liquid fertilizer and/or other agricultural product comprises any of the components recited in Examples 1-46.

Example 53 is a composition. The composition includes a structural particle. The composition includes a plurality of ions disposed around the structural particle. The composition is such that the plurality of ions form a plurality of ion layers surrounding the structural particle. The composition is such that the plurality of ions comprises a plurality of a first ion having a positive charge. The composition is such that the plurality of ions comprises a plurality of a second ion having a negative charge.

Example 54 is a composition as in Example 53, wherein: the structural particle comprises a net negative charge; the plurality of the first ion having the positive charge forms a first ion layer surrounding the structural particle; the plurality of the second ion having the negative charge forms a second ion layer surrounding the structural particle; and the first ion layer is nearer to the structural particle than the second ion layer.

Example 55 is a composition as in any of Examples 53-54, wherein: the structural particle comprises a net positive charge; the plurality of the first ion having the positive charge forms a first ion layer surrounding the structural particle; the plurality of the second ion having the negative charge forms a second ion layer surrounding the structural particle; and the second ion layer is nearer to the structural particle than the first ion layer.

Example 56 is a composition as in any of Examples 53-55, wherein the plurality of ion layers comprises: one or more positive ion layers comprising a plurality positively charged ions; and one or more negative ion layers comprising a plurality of negatively charged ions.

Example 57 is a composition as in any of Examples 53-56, wherein the plurality of ion layers are disposed around the structural particle with alternating polarity such that a positive ion layer comprising positively charged ions is adjacent to a negative ion layer comprising negatively charged ions.

Example 58 is a composition as in any of Examples 53-57, wherein the structural particle comprising a high cation exchange capacity.

Example 59 is a composition as in any of Examples 53-58, further comprising water, and wherein the plurality of ions are disposed around the structural particle even when disposed within an aqueous solution.

Example 60 is a composition as in any of Examples 53-59, further comprising ultrapure water.

Example 61 is a composition as in any of Examples 53-60, wherein the structural particle is zeolite.

Example 62 is a composition as in any of Examples 53-61, wherein the plurality of ions comprise fertilizer for effectuating a desired result in a plant.

Example 63 is a composition as in any of Examples 53-62, wherein the plurality of the first ion having the positive charge comprises one or more of nitrogen, phosphorous, phosphate, chlorine, silicon, and sulfur.

Example 64 is a composition as in any of Examples 53-63, wherein the composition comprises: an effective amount of the plurality of the first ion for effectuating a desired result in a plant, wherein the first ion is a fertilizer; and an effective amount of the plurality of the second ion for effectuating a desired result in a plant, wherein the second ion is a fertilizer.

Example 65 is a composition as in any of Examples 53-64, wherein the plurality of ions are disposed around the structural particle to form a multiple ion nanoparticle, and wherein the composition further comprises an effective amount of water for maintaining the multiple ion nanoparticle in solution.

Example 66 is a composition as in any of Examples 53-65, wherein the structural particle comprises a plurality of cation exchange sites, and wherein one or more native ions are naturally disposed within at least a portion of the plurality of cation exchange sites of the structural particle.

Example 67 is a composition as in any of Examples 53-66, wherein at least one of the plurality of the first ion or the plurality of the second ion are attracted to the plurality of cation exchange sites of the structural particle, and wherein at least a portion of the plurality of the first ion and/or the plurality of the second ion replace the one or more native ions that are naturally disposed within the plurality of cation exchange sites of the structural particle.

Example 68 is a composition as in any of Examples 53-67, wherein the structural particle is bathed in ultrapure water prior to being combined within the plurality of ions in the composition.

Example 69 is a composition as in any of Examples 53-68, wherein the plurality of ions disposed around the structural particle form a multiple ion nanoparticle, and wherein the multiple ion nanoparticle is sized and polarized such that the multiple ion nanoparticle can pass through a plant cell wall.

Example 70 is a composition as in any of Examples 53-69, wherein the multiple ion nanoparticle is sized and polarized such that the multiple ion nanoparticle can be absorbed through a leaf stoma guard cell of a plant.

Example 71 is a composition as in any of Examples 53-70, wherein the plurality of ions disposed around the structural particle form a multiple ion nanoparticle, and wherein the multiple ion nanoparticle delivers at least a portion of the plurality of ions to a plant by puncturing a leaf cell membrane and releasing at least a portion of the plurality of ions to an interior of a plant cell.

Example 72 is a composition as in any of Examples 53-71, further comprising a dielectric tensoionic salt.

Example 73 is a composition as in any of Examples 53-72, further comprising rubidium chloride in solution with the structural particle and the plurality of ions.

Example 74 is a composition as in any of Examples 53-73, further comprising orthosilicic acid in solution with the structural particle and the plurality of ions.

Example 75 is a composition as in any of Examples 53-74, wherein the first ion layer comprises only positively charged ions.

Example 76 is a composition as in any of Examples 53-75, wherein the second ion layer comprises only negatively charged ions.

Example 77 is a composition as in any of Examples 53-76, wherein the first ion layer comprises at least 80% positively charged ions.

Example 78 is a composition as in any of Examples 53-77, wherein the second ion layer comprises at least 80% negatively charged ions.

In the foregoing Detailed Description of the Disclosure, various features of the disclosure are grouped together in a single implementation or embodiment for the purpose of streamlining the disclosure. This method of disclosure is not to be interpreted as reflecting an intention that the claimed disclosure requires more features than are expressly recited in each claim. Rather, as the following embodiments reflect, inventive aspects lie in less than all features of a single foregoing disclosed embodiment. Thus, the following embodiments are hereby incorporated into this Detailed Description of the Disclosure by this reference, with each embodiment standing on its own as a separate embodiment of the disclosure.

It is to be understood that the above-described arrangements are only illustrative of the application of the principles of the disclosure. Numerous modifications and alternative arrangements may be devised by those skilled in the art without departing from the spirit and scope of the disclosure and the appended claims are intended to cover such modifications and arrangements. Thus, while the disclosure has been shown in the drawings and described above with particularity and detail, it will be apparent to those of ordinary skill in the art that numerous modifications, including, but not limited to, variations in size, materials, shape, form, ratios of elements or molecules, function and manner of operation, assembly and use may be made without departing from the principles and concepts set forth herein.

What is claimed is:

1. A composition comprising:

a structural particle comprising a net negative charge;

a plurality of fertilizer ions disposed around the structural particle; and a silicic acid;

wherein the plurality of fertilizer ions forms a plurality of ion layers surrounding the structural particle, and wherein the plurality of ion layers comprises:

a first ion layer comprising a plurality of positively charged fertilizer ions; and a second ion layer comprising a plurality of negatively charged fertilizer ions; and wherein the first ion layer is nearer to the structural particle than the second ion layer.

2. The composition of claim 1, wherein the plurality of the positively charged fertilizer ions of the first ion layer make up at least a majority of all ions within the first ion layer; and wherein the plurality of the negatively charged fertilizer ions of the second ion layer make up at least a majority of all ions within the second ion layer.

3. The composition of claim 1, wherein the plurality of the positively charged fertilizer ions of the first ion layer make up at least 80 percent of all ions within the first ion layer; and wherein the plurality of the negatively charged fertilizer ions of the second ion layer make up at least 80 percent of all ions within the second ion layer.

4. The composition of claim 1, wherein the plurality of ion layers are disposed around the structural particle with alternating polarity such that a positive ion layer comprising positively charged ions is adjacent to a negative ion layer comprising negatively charged ions.

5. The composition of claim 1, wherein the structural particle comprises a high cation exchange capacity.

6. The composition of claim 5, further comprising water, wherein the silicic acid seeds a cation deposition of the plurality of positively charged fertilizer ions into a plurality of cation exchange sites of the structural particle.

7. The composition of claim 1, wherein the structural particle is zeolite.

8. The composition of claim 1, wherein the first ion layer comprises one or more of nitrogen, potassium, magnesium, calcium, or silicon.

9. The composition of claim 1, wherein the composition comprises:

an effective amount of the plurality of the positively charged fertilizer ions for effectuating a desired result in a plant; and an effective amount of the plurality of the negatively charged fertilizer ions for effectuating a desired result in a plant.

10. The composition of claim 1, wherein the structural particle comprises a plurality of cation exchange sites;

wherein a plurality of native ions is naturally disposed within at least a portion of the plurality of cation exchange sites of the structural particle; and wherein the structural particle exchanges at least a portion of the plurality of native ions with at least a portion of the plurality of positively charged fertilizer ions.

11. The composition of claim 1, wherein the structural particle is bathed in ultrapure water prior to being combined within the plurality of fertilizer ions in the composition.

12. The composition of claim 1, wherein the plurality of fertilizer ions disposed around the structural particle form a multiple ion nanoparticle, and wherein the multiple ion nanoparticle is sized and polarized such that the multiple ion nanoparticle can pass through a plant cell wall.

13. The composition of claim 1, wherein the plurality of fertilizer ions disposed around the structural particle form a multiple ion nanoparticle, and wherein the multiple ion nanoparticle is sized and polarized such that the multiple ion nanoparticle can be absorbed through a leaf stoma guard cell of a plant.

14. The composition of claim 1, wherein the plurality of fertilizer ions disposed around the structural particle form a multiple ion nanoparticle, and wherein the multiple ion nanoparticle delivers at least a portion of the plurality of fertilizer ions to a plant by puncturing a leaf cell membrane and releasing at least a portion of the plurality of ions to an interior of a plant cell.

15. The composition of claim 1, further comprising a dielectric tensoionic salt.

16. The composition of claim 1, further comprising rubidium chloride in solution with the structural particle and the plurality of ions.

17. The composition of claim 1, wherein the silicic acid is orthosilicic acid, and wherein the orthosilicic acid is in solution with the structural particle and the plurality of ions.

18. The composition of claim 1, wherein the structural particle is a silicate mineral.

19. The composition of claim 1, wherein the structural particle is one or more of a phyllosilicate mineral or a tectosilicate mineral.

20. The composition of claim 1, wherein the structural particle is inorganic.

21. The composition of claim 1, wherein the structural particle comprises one or more of alkali metals or alkaline earth metals.

22. The composition of claim 1, wherein the structural particle is a clay comprising a sedimentary rock.

23. The composition of claim 1, wherein the second ion layer comprises one or more of nitrogen, phosphorous, molybdenum, boron, or sulfur.

24. The composition of claim 1, further comprising water and a salt, wherein the salt increases surface tension.

* * * * *